US008687840B2

(12) United States Patent
Samanta Singhar

(10) Patent No.: US 8,687,840 B2
(45) Date of Patent: Apr. 1, 2014

(54) SMART BACKLIGHTS TO MINIMIZE DISPLAY POWER CONSUMPTION BASED ON DESKTOP CONFIGURATIONS AND USER EYE GAZE

(75) Inventor: Anil Ranjan Roy Samanta Singhar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 13/104,734

(22) Filed: May 10, 2011

(65) Prior Publication Data

US 2012/0288139 A1 Nov. 15, 2012

(51) Int. Cl.
*G06K 9/00* (2006.01)

(52) U.S. Cl.
USPC ........... 382/100; 382/103; 382/117; 382/118; 382/159

(58) Field of Classification Search
USPC ......................................................... 382/100
See application file for complete search history.

(56) References Cited

U.S. PATENT DOCUMENTS

| 5,717,522 | A * | 2/1998 | Hattori et al. ................. 359/465 |
| 6,874,019 | B2 | 3/2005 | Hamilton |
| 7,445,549 | B1 * | 11/2008 | Best ................. 463/32 |
| 7,685,191 | B1 | 3/2010 | Zwicky |
| 7,840,911 | B2 | 11/2010 | Milener |
| 7,864,353 | B2 | 1/2011 | Choi |
| 8,165,347 | B2 * | 4/2012 | Heinzmann et al. .......... 382/103 |
| 8,320,641 | B2 * | 11/2012 | Steinberg et al. ............. 382/117 |
| 8,587,641 | B2 * | 11/2013 | Roth ............................... 348/55 |
| 2003/0052903 | A1 | 3/2003 | Weast |
| 2003/0146897 | A1 | 8/2003 | Hunter |
| 2006/0227125 | A1 | 10/2006 | Wong et al. |
| 2007/0146344 | A1 * | 6/2007 | Martin et al. ................. 345/173 |
| 2008/0082509 | A1 | 4/2008 | Bessieres |
| 2008/0111833 | A1 | 5/2008 | Thorn et al. |
| 2008/0141049 | A1 * | 6/2008 | Hassan et al. ................. 713/320 |
| 2008/0218535 | A1 | 9/2008 | Forstall et al. |
| 2010/0231610 | A1 * | 9/2010 | Hoffman et al. .............. 345/660 |
| 2010/0249532 | A1 * | 9/2010 | Maddess et al. .............. 600/300 |
| 2011/0231011 | A1 * | 9/2011 | Powers ......................... 700/236 |
| 2012/0105490 | A1 * | 5/2012 | Pasquero et al. .............. 345/690 |
| 2012/0288139 | A1 | 11/2012 | Singhar ......................... 382/103 |
| 2013/0033485 | A1 * | 2/2013 | Kollin et al. .................. 345/419 |
| 2013/0148740 | A1 * | 6/2013 | Samanta Singhar ..... 375/240.24 |
| 2013/0212501 | A1 * | 8/2013 | Anderson et al. ............. 715/764 |
| 2013/0243270 | A1 * | 9/2013 | Kamhi et al. ................. 382/118 |
| 2013/0260360 | A1 * | 10/2013 | Baurmann et al. ........... 434/365 |
| 2014/0002352 | A1 * | 1/2014 | Jacob et al. ................... 345/156 |

OTHER PUBLICATIONS

International Search Report and Written Opinion—PCT/US2012/036021, International Search Authority—European Patent Office, Jul. 26, 2012.

(Continued)

*Primary Examiner* — Jayesh A Patel
*Assistant Examiner* — Iman K Kholdebarin
(74) *Attorney, Agent, or Firm* — Nicholas A. Cole

(57) ABSTRACT

Methods and devices to conserve power on a mobile device determine an active region on a display and dimming a portion of the display backlight corresponding to the non-active regions. The method includes detecting an active region and a non-active region on a display. The detection may be based on a user interaction with the display or processing an image of the user to determine where on the display the user is looking. The method may control a brightness of a backlight of the display depending on the active and non-active region.

56 Claims, 16 Drawing Sheets

(56) References Cited

OTHER PUBLICATIONS

Vasily G. Moshnyaga, et al., "A Hardware Implementation of the User-Centric Display Energy Management." Integrated Circuit and System Design, Power and Timing Modeling, Optimization and Simulation Lecture Notes in Computer Science, 2010, vol. 5953/2010, 56-65, DOI: 10.1007/978-3-642-11802-9_10. <http://www.springerlink.com/content/j5611833x287208g/abstract/?target=print>.

* cited by examiner

LED BACKLIGHT PLANE

PIXEL PLANE

SMART BACKLIGHTS TO MINIMIZE DISPLAY POWER CONSUMPTION BASED ON DESKTOP CONFIGURATIONS AND USER EYE GAZE

FIELD OF THE INVENTION

The present invention relates generally to computing devices, and more particularly to power saving methods for computer devices.

BACKGROUND

Increasingly, people are using mobile computing devices to consume media. Generally, battery life is limited. Once the battery is depleted, the mobile device will shut down and cannot be restarted until a plug can be found or a new battery is provided. This is very frustrating as a user cannot use the mobile device while the battery is drained. Additionally, there are times where the user is only using a certain portion of the display, yet a large amount of energy is expended to light the entire display, which may result in faster battery depletion.

On modern personal computing systems, the display is a significant power consumer and the power consumed by a liquid crystal display ("LCD") backlight far exceeds the power consumed by the LCD itself. Additionally, backlight systems using Cold Cathode and Hot Cathode Fluorescent Lamp (CCFL/HCFL) sources also consume a significant amount of power relative to other components of the computer. Even a small power consumption savings in the backlight may result in the user able to use the mobile device for an extended period of time, which is advantageous.

SUMMARY

Methods and devices enable a device having a backlight system to conserve power. A method of conserving power usage for a device includes detecting an active region on a display on which the user is focused. The method also includes detecting a non-active region on the display based on a user's gaze or interaction with the display. The method also includes controlling a brightness of a backlight portion of the display depending on the active and non-active region.

In another aspect, the method includes recognizing a first region where a user's focus of gaze is present and forming a second region where the user's focus of gaze is not present and controlling a backlight in the second region to conserve power. In another aspect, detecting the active region and the non-active region comprises imaging a user of the device and recognizing a feature of the user. The method may include determining a gaze of the user based on the recognized feature, setting a portion of the display encompassing the user's gaze as the active region, and setting a portion outside the active region as the non-active region.

In another aspect, a method conserves power usage for a device by controlling portions of a backlight for the device display. The method includes detecting a user's focus of gaze on an active region and a non-active region on the display based on a user interaction with the display. The method includes controlling a brightness of a backlight of the display depending on the active and non-active region. The method also includes providing a plurality of backlight LEDs and individually controlling each LED of the backlight independently relative to a remainder of the LEDs. In another aspect, the method may include providing a plurality of backlight LEDs in a plurality of banks of LEDs and individually controlling each LED independently of the banks.

The method may individually control each LED independently of the banks by using a timing controller. The timing controller can produce multiple pulse width modulation waveforms. The brightness of a light emitting diode or a group of light emitting diodes may be determined by a pulse width modulation waveform that is applied to the light emitting diode.

The pulse width modulation waveform may include a fraction of time the light emitting diode is kept "ON". The pulse width modulation waveform may be generated by a timing controller circuit (TCON). The timing controller generates multiple pulse width modulation waveforms. The timing controller may control each of the light emitting diodes or may control banks of light emitting diodes. A brightness of multiple light emitting diodes, groups, or banks may be controlled.

In another aspect, a method of conserving power usage for a device includes detecting a user's focus of gaze on a display. The method uses the focus of gaze to define an active region and a non-active region on the display. The method may include controlling a brightness of a backlight of the display depending on the active and non-active region using an algorithm. The algorithm allows the individual control of each of the backlight LEDs by determining a location of the LEDs that are located in the active window and controlling LEDs independently outside of the active window.

In a further aspect, a computing device includes a display and a processor coupled to the display in which the processor is configured with processor-executable instructions to perform operations of the methods described above. In a further aspect, a computing device includes means for accomplishing each of the functions in the methods described above. In a further aspect, a non-transitory computer-readable medium has stored thereon processor-executable instructions configured to cause a processor of a computing device processor to perform operations of the methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1A:
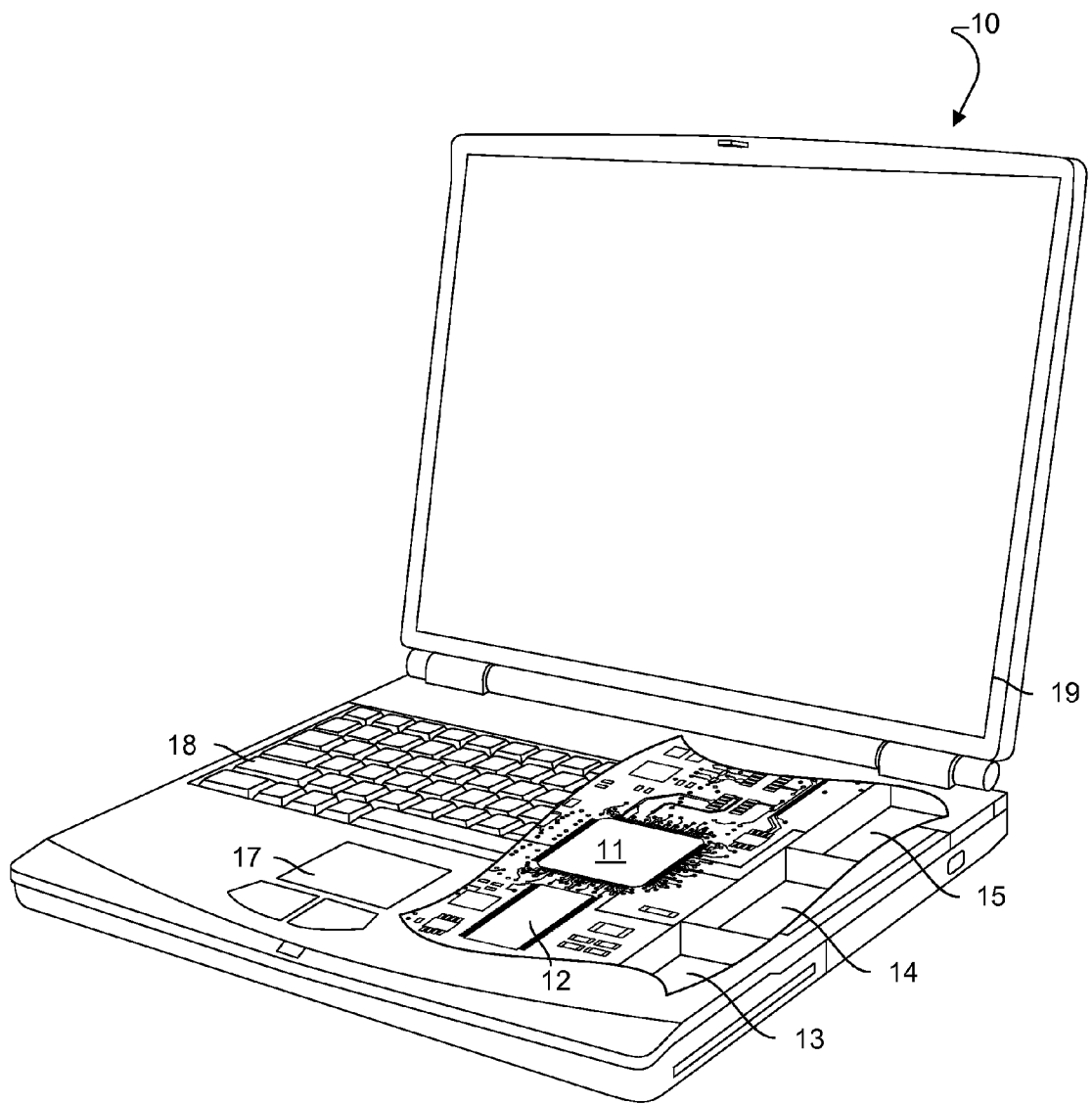
FIGS. 1A and 1B illustrate a laptop and a mobile device, respectively suitable for use with various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "handheld device" refer to any one or all of cellular telephones, personal data assistants (PDA's), palm-top computers, wireless electronic mail receivers, multimedia Internet enabled cellular telephones, Global Positioning System (GPS) receivers, wireless gaming controllers, tablet computers, notebook computers, net book computers, wireless email devices, and similar personal electronic devices that include a programmable processor and memory, and have display with a backlight. As used herein, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The various aspects described herein provide methods and systems that enable power saving in mobile devices and other computing devices that are battery powered and include a backlit display. In one aspect, a method of conserving power includes detecting an active region where a user is gazing on a display. The method includes assigning the area where the user's gaze is detected as an active region. The method includes assigning the remainder as non-active regions.

In one aspect, the method may include use of a camera associated with the mobile device to capture images of the user as the user is viewing the display. The method may include utilizing an anatomical model that is applied to the tracked images to determine where the user is looking. If the user is looking at the display, the portion of the display within the person's gaze is determined to be active. The other portions of the display are inferred to be non-active areas. In one aspect, the display may comprise one active area and four non-active areas; however, various configurations are possible and the display may comprise a minimum of one active area and one non-active area. The camera may be integrated within the mobile phone or other computing device, or may be a separate component coupled to the device.

In another aspect suitable for implementation on a computing device not equipped with a camera, the active area may be inferred based on the user's interactions. For example, the user may interact with the computing device using an input device, such as, a mouse, a touch screen, a touchpad, a trackball, a keyboard, an infrared camera, a motion tracking device, or any other input device known in the art. Generally, the user may use the input device to control a graphical user interface pointer and move the graphical user interface pointer on a display screen. A software operating system may have or may obtain a location of a graphical user interface cursor or may obtain a location where a user's touch screen input is located on a touch screen. The software operating system may use this location information to determine active portions of the display.

The active portion may be inferred from a location of the cursor on the screen. The active portion may also be inferred from text that is being added to a displayed document by user inputs on a keyboard or a location on the screen of the inputs. The non-active portion of a display may be determined as those portions not in the active portion.

Once the active and non-active portions of the display are determined, the backlight of the mobile communication device may be controlled to reduce power consumption of the non-active portions. A subset of the light emitting diodes in the backlight can be dimmed on the non-active areas to provide power savings. The aspects provide a method and apparatus for controlling the backlight with a fine granularity based on the active and non-active areas of the display.

The present backlight has a number of light emitting diodes that are operatively connected to a backlight timing controller (TCON). The backlight timing controller may generate multiple pulse width modulation signals. Each of the pulse width modulation signals may include different duty cycles to drive individual LEDs or individual cluster of LEDs present on the backlight. The backlight timing controller includes a fine granularity of control. For example, a common 1080p display includes 1920×1080 pixels and may be illuminated by a backlight with 192×108 LEDs. Here each LED is responsible for lighting up a square grid of 10×10 pixels. However the timing controller is able to control clusters of 12×12 LEDs. The timing controller may be capable of generating 144 different pulse width modulated signals or the number of LEDs (192×108)/clusters (12×12)=(16×9)=144 different pulse width modulation signals.

The aspects enable saving power by dynamically reducing a brightness level of those regions of a computer screen that are not in direct view of the user at any given time using a backlight. A typical user does not look at the entire screen at any point of time, but rather the user's eyes are focused on a smaller region of the screen, or the active region. The region surrounding the active region is deemed the non-active region.

The aspect methods and devices determine a location of the active region or an active window and brighten the active region or window while reducing the brightness of the non-active regions. In another aspect, the active region may maintain a given brightness level while the non-active regions are dimmed after a predetermined interval.

The aspect method may include determining a location of the active region by monitoring the user using the mobile device or peripheral devices with a video camera to actively monitor a user's eye gaze direction. A processor associated with the mobile device may determine a user's eye gaze as focused on a specific point on the display of the mobile device, which is used to estimate where on the mobile device display the active region/window is located.

In a different aspect, a location of the active region can be inferred or determined using information available to the device operating system. For example, a user may open one or more windows using an input device. The mobile device can obtain coordinates of an active window from a desktop window manager or a display driver corresponding to the opened window. A window of an application into which the user is inputting commands can be used to define the active window, with other regions outside of that window being deemed non-active regions.

FIG. 1A shows a laptop computer 10 including a display 19 that includes a number of pixel elements (e.g., liquid crystal elements) and a number of backlight light emitting diodes located behind the pixel elements. The relationship between the pixel elements and the backlight LEDs is shown in FIG. 4. The aspects described above may be implemented within a variety of personal computing devices, such as a laptop computer 10 as illustrated in FIG. 1A. Many laptop computers include a touch pad touch surface 17 that serves as the computer's pointing device, and thus may receive drag, scroll, and flick gestures similar to those implemented on mobile computing devices equipped with a touch screen display and described above. A laptop computer 10 will typically include a processor 11 coupled to volatile memory 12 and a large capacity nonvolatile memory, such as a disk drive 13 of Flash memory. The computer 10 may also include a floppy disc drive 14 and a compact disc (CD) drive 15 coupled to the processor 11.

The computer device 10 may also include a number of connector ports coupled to the processor 11 for establishing data connections or for receiving external memory devices, such as a USB or FireWire® connector sockets, or other network connection circuits for coupling the processor 11 to a network. In a notebook configuration, the computer housing includes the touchpad 17, keyboard 18, and the display 19 all coupled to the processor 11. Other configurations of computing device may include a computer mouse or trackball coupled to the processor 11 (e.g., via a USB input) as are well known, which may also be use in conjunction with the various aspects. The display 19 includes a number of light emitting diodes that form a backlight. Each of the light emitting diodes of the backlight may be arranged in banks where each light emitting diode may be controlled by the processor 11 for power savings. In another aspect, each bank, cluster, or group of LEDs may be controlled by a timing controller instead of the processor 131. As mentioned, the timing controller may be a specialized integrated circuit which may be located on the display panel, or that may be a separate element relative to the display panel. In each of the aspects, the processor 131 may be replaced with a timing controller or replaced with an integrated circuit that is located on the display panel. A feature recognition camera 105 for tracking the user of the laptop computer device 10 may also be provided as a component of the laptop computer 10. The camera 105 may be placed in a location to track the user and capture video images. An anatomical model may be applied to the tracked video images to determine where a focus of gaze of the user on the display 19 is located for power savings.

Figure 1B:
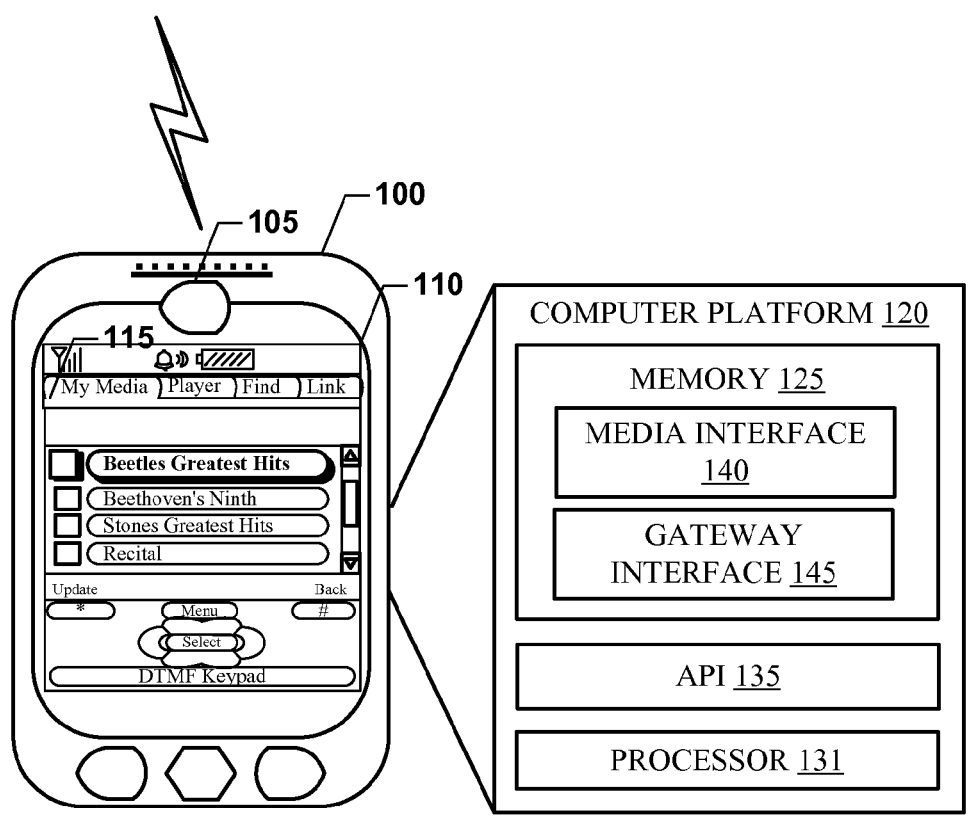

FIG. 1B shows a mobile device 100 including a feature recognition camera 105 that may capture an image of a user of the device 100. The mobile device 100 also has a display 110 that provides a graphical user interface (GUI). The mobile device 100 may have one or more icons 115 on the display that form the graphical user interface (GUI).

Mobile devices 100 typically include a computer platform 120 having a memory 125 in communication with a processor 131, such as via an application programming interface (API) 135 that enables interaction with any resident. Mobile devices 100 typically include a platform 120 that has an optional interface 140 and 145 to communicate with the network.

Figure 2:
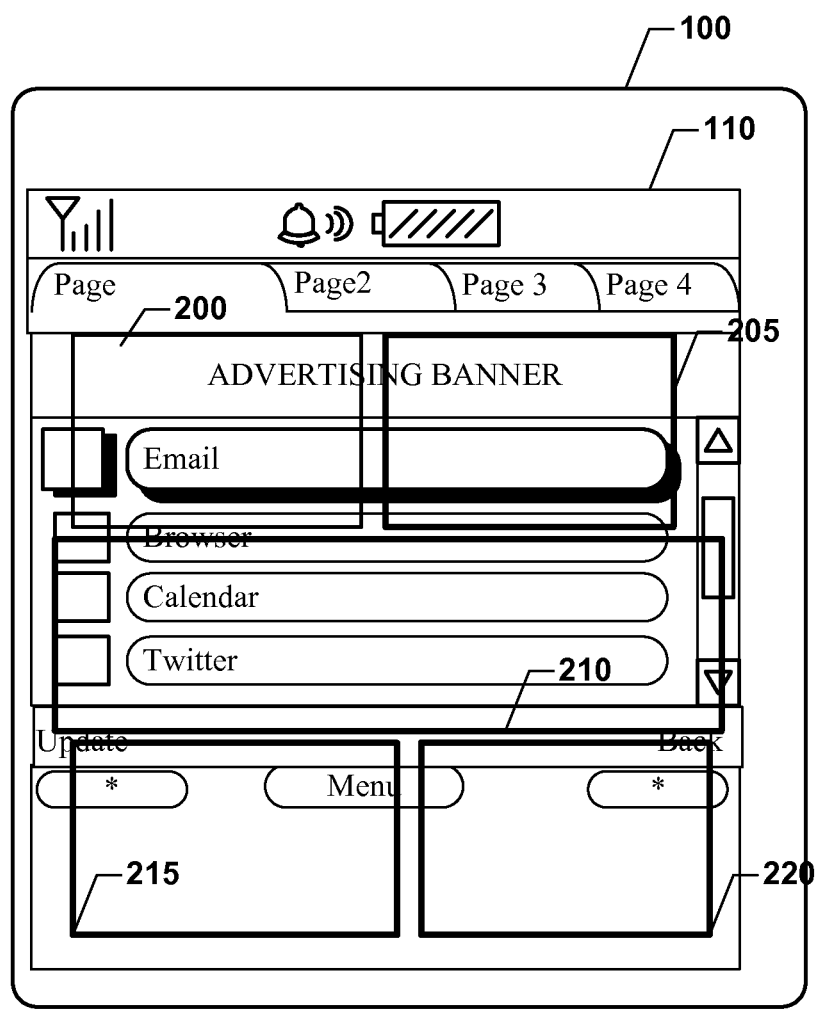
FIG. 2 is an enlarged view of the display screen on a mobile device.

FIG. 2 shows a display 110 of the mobile device 100. As can be seen from the display 110, the display can be partitioned into at least one active area, or active region and at least another area or region which is defined as non-active. The terms "portions," "area," and "region" are used interchangeably to refer to a portion of a subset of the display 110 that may be defined by a width and height or diameter within the display 110. This does not necessarily mean that the portions should be rectangular or should be circular as the portions may include any shape or delineation in the art in order to affect a power savings. In the aspect shown in FIG. 2, the display 110 may include a top left region 200, a top right region 205, a center region 210, a bottom left region 215 and a bottom right region 220. In an alternative aspect, the display 110 may be divided into a top left region, a top right region, and a center region. In yet another aspect, the display 110 may also be divided into one rectangular region and the surrounding annular region.

The bottom right region 220, the bottom left region 215, and the centermost region 210 are also shown as rectangular shaped regions that are determined by a processor 131 on the display 110. The number of regions 200-220 on the display 110 can vary depending on the size of the display 110, battery life, the user's gaze, the power consumption of a backlight, a number of backlight LEDs, or by other parameters. Similarly, the laptop 10 display 19 of FIG. 1A may also include a top left region 200, a top right region 205, a center region 210, a bottom left region 215 and a bottom right region 220. In another aspect, the center region 210 may be partitioned further into a center left region and a center right region. In another aspect, although the regions are shown as polygonal shapes, the regions may have other shapes, for example, a circular, triangular, elliptical or irregular shape or a shape to match the user's detected gaze patterns. In a further aspect, the regions 200-220 may each be differently shaped; for example a first region 200 may be circular 205 while a second region 220 may be triangular, etc. In another aspect, the regions 220-220 may be defined by images rendered by pixels, icons, or a window displayed on the display 110.

Though power characteristics will vary from device 100 to device 100 using the instant system, power is saved when the backlight is dimmed. For example, when a backlight is at full brightness the power consumed by the display 110 subsystem is about 34%-38% of the total system power consumption, and the back light consumes about 26%-29% of total system power consumption. About 8%-9% of the total system power is consumed by a liquid crystal display panel.

When the backlight is at full brightness, the power consumed by the display 110 subsystem is about 19% of the total system power consumption. About 7% of total system power is consumed by the backlight and about 12% of the total system power is consumed by the liquid crystal display 110 panel or the pixels. Thus, the system power consumption may be reduced by about 19%-22% when the processor 131 dims the backlight fully. If the user chooses to use a smaller region of the display 110, such as making only a quarter of the entire display 110 the active region, the processor 131 may dim three quarters of the backlight to enable reducing system power consumption by about 14% to about 16%. These estimates of power consumption and power savings enabled by the aspects are not intended to limit the present disclosure and many factors may affect the total efficiencies and power savings that may be achieved by implementing the aspects.

Figure 3A:
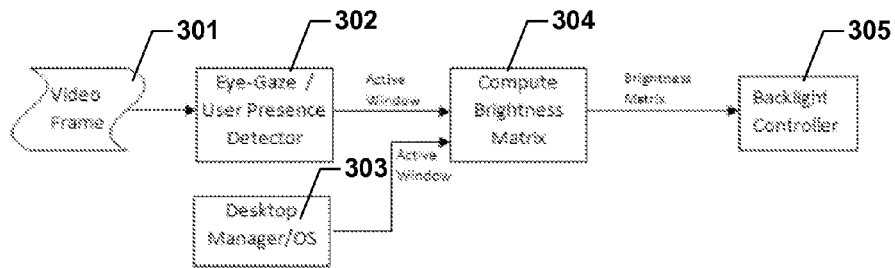
FIG. 3A is a process block diagram illustrating functional modules involved in generating a display on a computing device including a backlight and a backlight controller and a desktop manager and an eye-gaze detector.
Figure 3B:
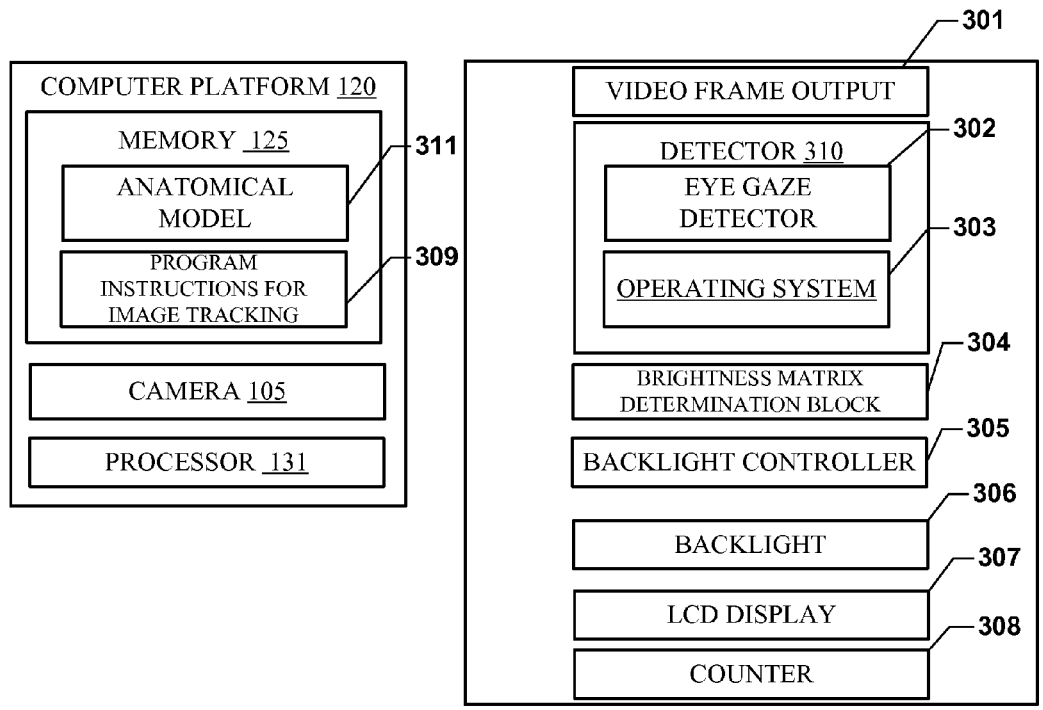
FIG. 3B is a display process block diagram illustrating functional modules involved in generating a display on a computing device including a backlight and a backlight controller.

FIGS. 3A and 3B show high level diagrams of a number of components of the mobile device 100. FIG. 3A shows the image tracking video output block 301 that is provided to the detector 302 to determine the eye gaze using detector block 302. In another aspect, the mobile device 100 may include an operating system 303 that provides data from a desktop manager to block 304. The inputs from a touch screen or input relating to a window in use may be used to infer the active region. For example, a touch screen may receive inputs from a user touching an icon displayed on the screen 110. The processor 131 may infer that the user's touch in a specific region of the display 110 is relevant. This touched region or portion can be inferred to be the active region.

For example, a mouse or touchpad may receive an input from a user selecting an icon displayed on the display 110. For example, a keyboard or virtual keyboard also may provide an input from a user. Inputs can be provided to a specific application window displayed on the display 110. Inputs may be provided in a window displayed on the display 110. A top window that is used by the user can be detected while a second window may be unused and detected as unused.

In an implementation with multiple windows presented on the display simultaneously, the processor 131 may infer that since the user utilizing a top window, this specific region or where the top window is located is the active region. For example, the four corners of a window may be the active region and regions outside this window may be the inactive region. In another aspect, the detector 310 may receive an input from the operating system 303 and may supplement the eye gaze detector 302.

In the various aspects, the mobile device 100 includes a backlight controller 305. The backlight controller 305 may be connected to a number of backlights 306 within the LCD display 307. A brightness matrix determination block 304 may be connected to the backlight controller 305 to determine a first brightness level for the active region while a second level (e.g., a lower brightness level) for the non-active regions. The brightness levels of the pixels that make up the LCD display 307 remain unchanged. The brightness matrix determination block 304 may dim a first subset of the backlight LEDs 306 and may increase the brightness of a second subset of the backlight LEDs 306. In another aspect, the brightness matrix determination block 304 may maintain a brightness level of a first subset of the backlight LEDs 306 and increase the brightness of a second subset of the backlight LEDs 306 (which is the active region).

In another aspect, the brightness matrix determination block 304 may decrease a brightness level of a first subset of the backlight LEDs 306 based on a distance of the LEDs from the active region and maintain the brightness of a second subset of the backlight LEDs 306 (which is the active region). The brightness matrix determination block 304 may dim a first subset of the backlight LEDs 306 by changing a duty cycle of electrical pulses applied to the first subset of LEDs and maintain the brightness of a second subset of the backlight LEDs 306 by keeping the duty cycle of the pulses substantially unchanged. In an aspect, each backlight LED 306 may be independently controlled by a processor 131. In another aspect, the backlight LEDs 306 may be controlled by a backlight controller. In yet another aspect, the backlight LEDs 306 may also be controlled by a timing controller. In a further aspect, clusters or groups of backlight LED 306 may be independently controlled by a timing controller.

FIG. 3B shows a platform 120 that includes a memory 125, a camera 105, and a processor 131 as previously discussed in FIG. 1A and in FIG. 1B. The memory 125 includes an anatomical data model 311 stored on the memory 125 and program instructions for image tracking 309. In an aspect, the program instructions 309 may access the anatomical model 311 stored in the memory 125 to provide a video-based eye tracker. The camera 105 focuses on one or both eyes. The processor 131 records their movement as the viewer looks at the display 110 or looks off the display 110. The camera 105 may locate a center of a user's pupil and may use infrared or near-infrared non-collimated light to create a corneal reflection. The vector between these two features can be used to compute an intersection of the user's gaze with a display surface 110 after a calibration process. The output of the camera 105 and the processor 131 may be provided to a detector 310. The detector 310 comprises an eye gaze detector 302 that may determine whether the user's gaze is on one of the display regions 200-220 (e.g., top left region 200, top right region 205, center region 210, bottom left region 215 and bottom right region 220) to form an active region.

Two general types of eye tracking techniques may be used by the eye gaze detector 302, for example, bright pupil detection and dark pupil detection. The difference is based on the location of the illumination source with respect to the optics. If the illumination is coaxial with the optical path the camera 105, the eye acts as a retro-reflector as the light reflects off the retina creating a bright pupil effect similar to red eye. If the illumination source is offset from the optical path, the pupil appears dark because the retro-reflection from the retina is directed away from the camera 105. The camera 105 may use a sampling rate of at least 30 Hz, or 50/60 Hz. In another aspect, the camera 105 may be operable at a sampling rate of at 240, 350 or even 1000/1250 Hz depending on the processor 131 used in the mobile device 100 and other factors. Other eye gaze detectors may be used with the mobile device 100.

Eye movement can be divided into fixations and saccades, when the eye gaze pauses in a certain position and when it moves to another position, respectively. The resulting series of fixations and saccades is called a scan path. Information from the eye can be made to determine the active region 200-220 during a fixation, or when the user's gaze fixates on the region for a display 110 for a predetermined time period. The detector 310 can count a time period of the eye's fixation on a certain area and compare that time period to a threshold time period (which may be counted by a counter, processor, or timer) prior to making a determination that the region is deemed the active region. On average, visual fixations may last for around 200 ms during the reading of linguistic text, and 350 ms during the viewing of a scene. For example, the counter 308 shown in FIG. 3B may start when the eye fixes on a region of the display 110. The counter 308 may be a digital or analog device that stores a time when an event occurs in relation to a clock signal. The counter 308 may be an up/down counter that counts up and/or down, under command of a control input, another digital counter, or the processor 131.

Figures 4A, 4B:
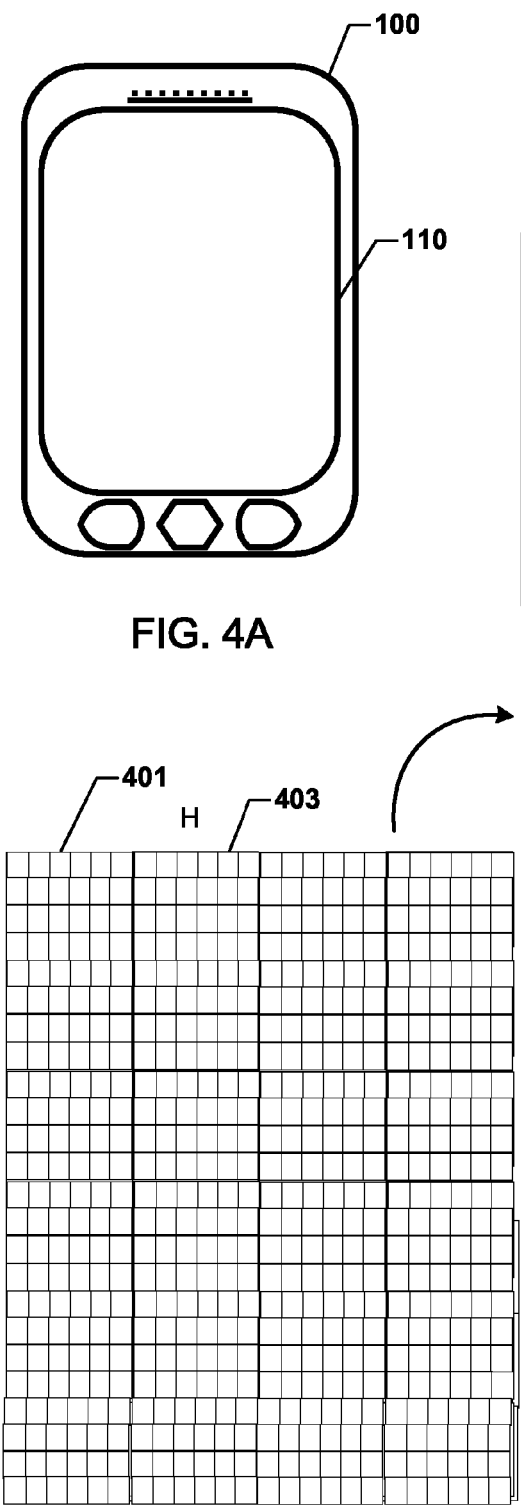
FIG. 4A shows a mobile communication device having a display and a backlight.
FIG. 4B is an exploded view of a display illustrating how display pixels in a pixel plane of the display are backlit by a number of backlights located in a second plane of the display.

FIGS. 4A and 4B show an exploded view of a display 110 (FIG. 4A) including a first plane 401 of pixel elements 403 and a second plane 402 of backlight LEDs 404 (FIG. 4B). The backlight LEDs 404 in the second plane 402 of the display 110 may include approximately thirty two LEDs 404 located behind the pixel LCDs 403. The LEDs 404 shown could be cluster of physical LEDs 404 which may be independently controllable. Though the figure shows a number of LEDs, 404 this number can be different and many vary. The backlight LEDs 404 may be configured to be modulated in brightness by the backlight controller 305 shown in FIG. 3B. The pixels in the LCD 403 may also be dimmed and/or brightened in response to determining the active region and the non-active region(s) but need not be, and control of the pixel brightness is not a subject of this disclosure.

Figure 5:
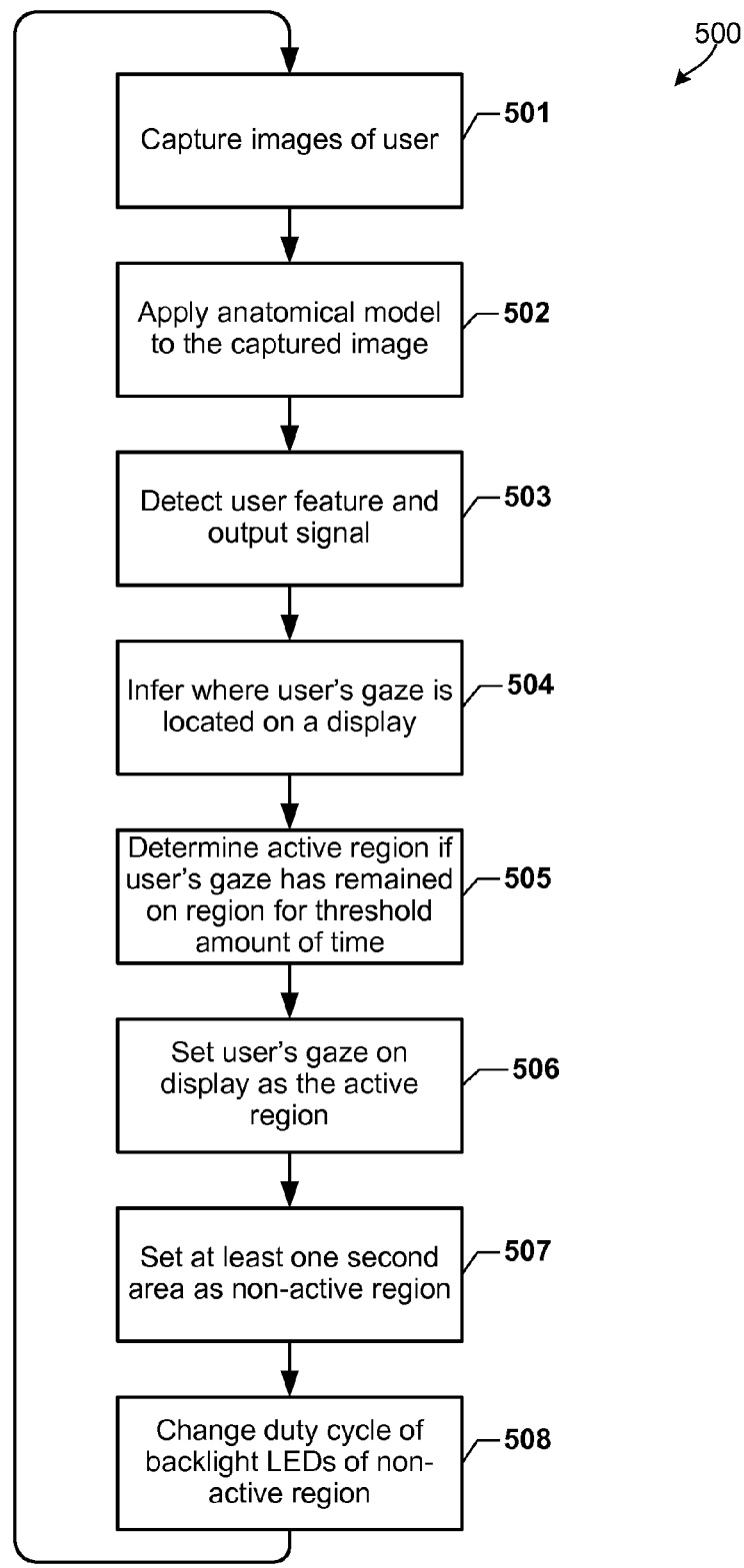
FIG. 5 is a process flow diagram of a method for changing a brightness parameter of backlight LEDs based on a user's detected gaze.

FIG. 5 illustrates an aspect method 500 for changing a brightness of a number of backlight LEDs based on a user's gaze in order to conserve power in a computing device 100. In another aspect, the method 500 may change a brightness of a number of LED clusters, banks, or groups. Method 500 may be implemented in a computing device having a processor 131 configured with processor-executable instructions to perform the operations of the method 500. In method 500, the processor 131 may commence operation at block 501 by capturing images of a user using a camera 105.

In block 502, the processor 131 may apply an anatomical model to the captured image that is captured using the camera 105 to detect a user's eye, a user's pupil, or other parameters relating to a user's face. For example, the processor 131 may process the image to recognize a user's two eyes and nose so the processor 131 may infer where the active region is located on the display 110. In block 503, the processor 131 output a signal and may detect a user feature. In block 504 the processor 131 may infer where a user's gaze is located on a display based on the recognized user feature. In block 505, the processor may determine an active region where a user's gaze has remained on a region for a threshold amount of time, for example, several seconds. Various threshold intervals are possible and within the scope of the present disclosure.

In block 506, the processor 131 may set the portion of the display within the user's gaze as the active region. For example, in the aspect shown in FIG. 2, in which the display 110 includes a top left region 200, a top right region 205, a center region 210, a bottom left region 215 and a bottom right region 220, the detected user's gaze on the center region 210 for a predetermined threshold duration, may prompt the processor 131 to set the center region 210 as the active region. In block 507, the processor 131 may set at least one second area as a non-active region. For example, determining an active region also determines the non-active region since the non-active region is equal to the entire display minus the active region.

For example, if the center region 210, for a time period, is set by the processor 131 as the active region, the remaining regions 200, 205, 215, and 220 may be set as the non-active regions. In block 508, the processor 131 may access the brightness matrix determination block 304 to determine and to change a duty cycle of the backlight light emitting diodes. For example, the processor 131 may change a brightness for each region of the display, and may control the backlight controller 305 to change a brightness parameter of the backlight LEDs. In another non-limiting aspect, the processor 131 may not directly determine the duty cycle. The processor 131 may control and feed in a new brightness level to the timing controller which generates the pulse width modulated signal with new reduced duty cycle.

The LEDs chosen for dimming may be based on a distance from the active region. For example, in one aspect, the LEDs that are located distant from the active region are dimmed more than those which are closer to the active region. In another aspect, the processor 131 may reduce brightness level of the LEDs in non-active region in a uniform manner or may dim the entire non-active region completely. Some of these dimming preference options may be implemented by the user. For example, the user may change dimming preferences using the device 100 through control panel settings using an operating system.

Preferably, the brightness level of the non-active region is decreased and a duty cycle of backlight LEDs in the non-active regions is changed. For example, a pulse width modulation signal is used to vary brightness. The timing controller or processor 131 may generate a new pulse width modulated signal with the new duty cycle.

Figure 6:
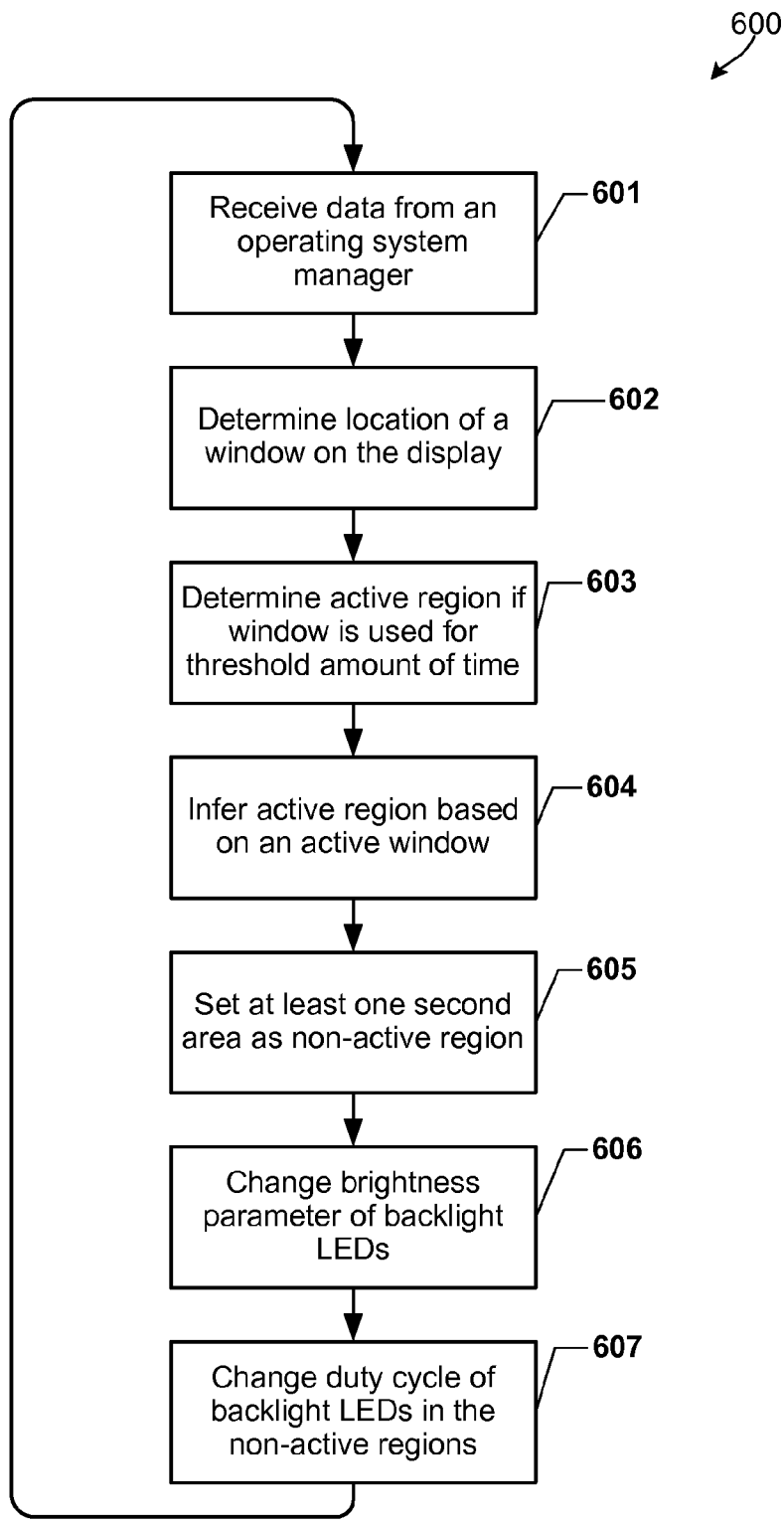
FIG. 6 is a process flow diagram of a method for changing a brightness parameter of backlight LEDs based on an active window in a graphical user interface display.

FIG. 6 illustrates an aspect method 600 for changing a brightness of a number of backlight LEDs based on a location of a top or active window on the display that the user is using. The aspect method 600 of FIG. 6 infers an active region based not on where the user is looking but instead by inferring the active region using information from the user's interactions with the device 100. In the aspect of FIG. 6, no image is taken of the user to determine whether the user's gaze is located. Instead, the aspect method 600 includes inferring that a region is active using a desktop manager or other application associated with an operating system of a device. The top or active window is determined from data received from an operating system. Method 600 may be implemented in a computing device having a processor 131 configured with processor-executable instructions to perform the operations of the method 600. In method 600, the processor 131 may commence operation at block 601 by receiving data from an operating system manager. For example, in one non-limiting aspect, the processor 131 may receive data from a MICROSOFT® WINDOWS® desktop windows manager.

In block 602, the processor 131 receives data that a window is being used, such as a window to enter text, or a cursor is positioned within the window, or a touch screen input that is located in a window. The window may be located as an active or top window among other windows that are unused. The processor 131 determines a location and size of the top window on the display 110. In block 603, the processor 131 may use the window and received parameters from the operating system to infer an active region on a display.

In block 603, the processor 131 may set an active region as encompassing the top or active window if the window is used for a threshold amount of time that would indicate that the user's gaze is located in the window. In an aspect, the active region may be a predetermined region of the display, such as the regions shown in FIG. 2, or may be other regions. In another aspect, the metes and bounds of the top active window the user is using may define the active region in size and shape.

In block 604, the processor 131 may set at least one second area of the display as a non-active region. For example, if the center region 210 was set by the processor 131 as the active region, the remaining regions 200, 205, 215, and 220 may be set by the processor 131 as the non-active region.

In block 605, the processor 131 may control a subset of LEDs. In block 606, the processor 131 may control the backlight controller 305. The processor 131 may access the brightness matrix determination block 304. The processor 131 may change a brightness parameter of the backlight LEDs by changing a duty cycle of the electrical pulses supplied to the backlight LEDS in the non-active regions. The processor 131 may maintain a brightness of the pixel LEDs.

Figure 7:
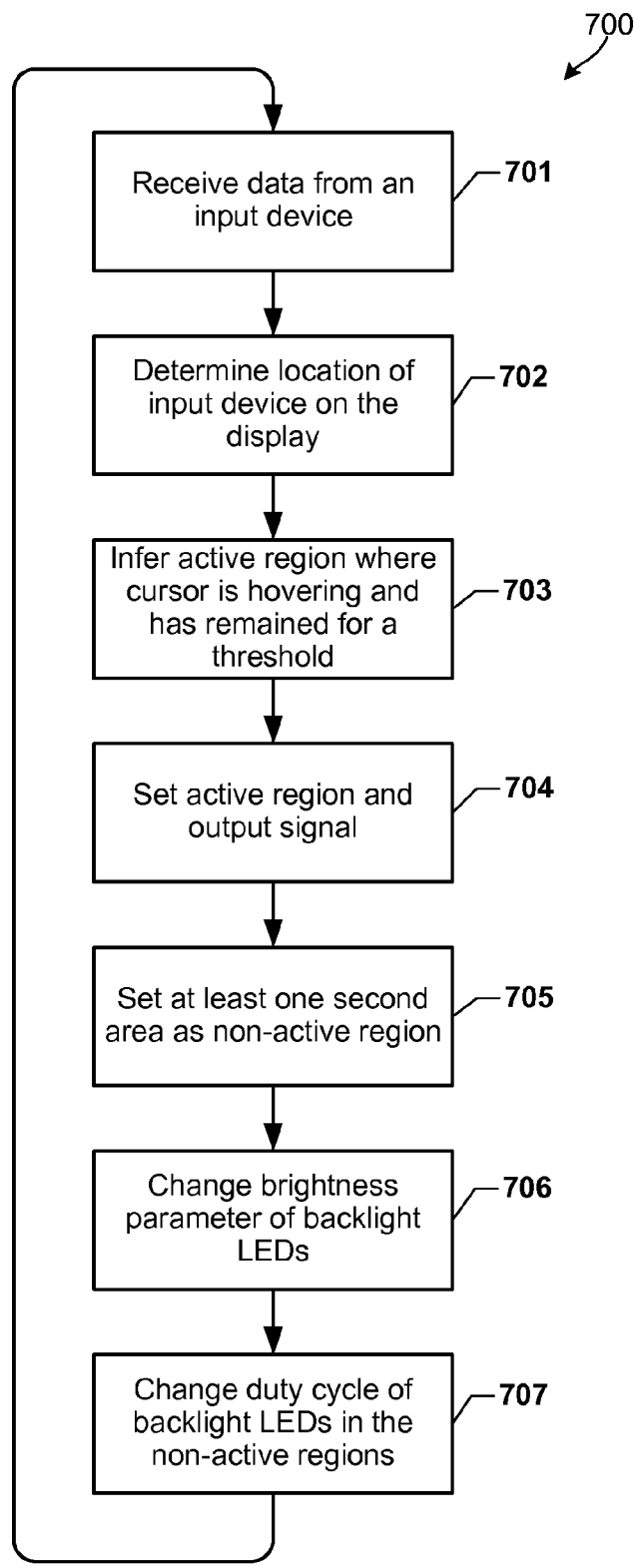
FIG. 7 is a process flow diagram of a method for changing a brightness parameter of backlight LEDs based on a cursor location in a graphical user interface display.

FIG. 7 illustrates an aspect method 700 for changing a brightness of a number of backlight LEDs based on an input received from an input device associated with the display 110 to conserve power in a device 100. In an aspect method 700 the processor 131 infers an active region based not on where the user is looking, but on the user's interaction with the device through a pointer input device. In method 700, an active region is located on the display based on where a mouse cursor is hovering on the screen. Method 700 may be implemented in a computing device having a processor 131 configured with processor-executable instructions to perform the operations of the method 700. In method 700, the processor 131 may commence operation at block 701. When the processor 131 receives data from an input device, such as, a mouse, a trackball, or a touch screen, data may be sent to determine an active region.

In block 702, the processor 131 determines a location of the input command on the display 110, such as where a mouse cursor (or touch screen command or other input) is positioned on the display 110. In block 703, the processor 131 may use this location data to infer the active region on a display 110 and may infer the active region where a cursor is hovering on the display and has remained on the display for a threshold time interval. In yet another alternative aspect, a camera 105 image of the user may be used together with the cursor location to determine the active region. In block 704, the processor 131 may set the active region as the portion of the display encompassing the cursor or a user's touch. For example, if the mouse input is received in the center region 210 of FIG. 2 and if the cursor has remained in the center region 210 for a predetermined time period, the center region 210 may be set as the active region by the processor 131.

In block 705, the processor 131 may set at least one second area as a non-active region. For example, if the center region 210 was set by the processor 131 as the active region, the remaining regions 200, 205, 215, and 220 may be set as the non-active region(s).

In block 706, the processor 131 may control the backlight controller 305 and may access the brightness matrix determination block 304 to determine a brightness of each region and may control the backlight controller 305 to change a brightness parameter of the backlight LEDs. For example, a first subset of LEDs may be controlled. In block 707, the processor 131 may control the backlight controller 305.

In block 707, the processor 131 may access the brightness matrix determination block 304. The processor 131 may change a duty cycle of the backlight light emitting diodes. For example, the processor 131 may change a brightness for each region of the display and may control the backlight controller 305 to change a brightness parameter of the backlight LEDs. The processor 131 may not directly determine the duty cycle. The processor 131 may feed in the new brightness level to the timing controller which generates the pulse width modulated signal with new reduced duty cycle. The LEDs chosen for dimming may be based on an LED's distance from the active region.

Figure 8:
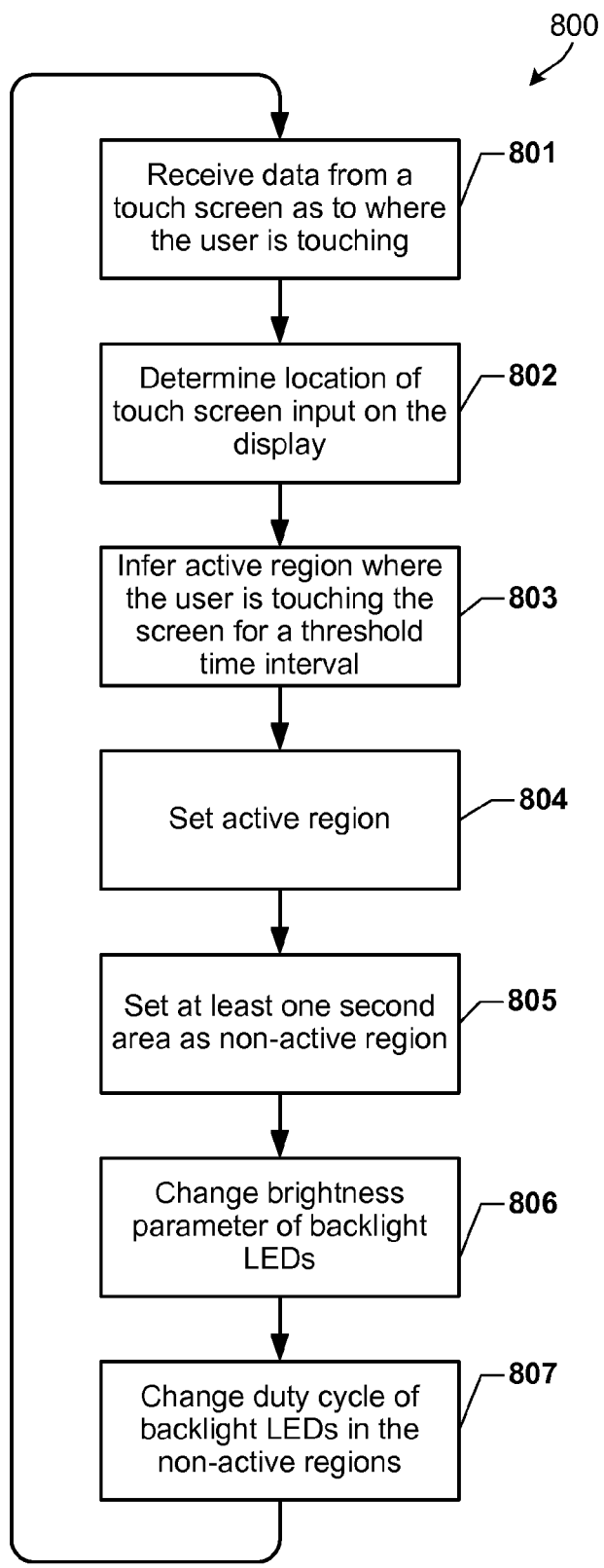
FIG. 8 is a process flow diagram of a method for changing a brightness parameter of backlight LEDs based on touch event locations on a touch sensitive display.

FIG. 8 illustrates an aspect method 800 for changing a brightness of a number of backlight LEDs based on a touch screen input. Method 800 may be implemented in a computing device having a processor 131 configured with processor-executable instructions to perform the operations of the method 800. In method 800, the processor 131 may commence operation at block 801 by receiving data from a touch screen input device as to where the user is touching the device 100. In block 802, the processor 131 may determine a location of the input command on the touch screen display 110. In block 803, the processor 131 may determine the active region is located on a display 110 based on the touch screen input and may infer the active region where one or more inputs are located on the display for a threshold time interval. For example, a user may be typing into a touch screen keyboard and into an email window for a time interval that is calculated from when a first touch screen input is made. Once the threshold interval is reached, the processor 131 may set the region as the active regions. For example, the four corners of the email window may be the active region and the remainder of the display is the non-active region.

In block 804, the processor 131 may set the active region on the display 110. For example, based on the touch screen input received on, for example, the center region 210, the center region 210 will be set by the processor 131 as the active region. In block 805, the processor 131 may determine the center region 210 as the active region. The regions 200, 205, 215, and 220 may be set as the non-active region(s). In block 806, the processor 131 may control the backlight controller 305 and may access the brightness matrix determination block 304.

The processor 131 may determine a brightness for each region of the display and may control the backlight controller 305 in block 807 to change a brightness parameter of the backlight LEDs by changing a duty cycle of the electrical pulses delivered to the backlight LEDS in the non-active regions. In block 807, the processor 131 may access the brightness matrix determination block 304 in FIG. 3, and use an obtained value to change a duty cycle of the backlight light emitting diodes in order to reduce power consumption by the backlight in the non-active regions. For example, the processor 131 may change a brightness for each region of the display and may control the backlight controller 305 to change a brightness parameter of the backlight LEDs. The processor 131 may not directly determine the duty cycle and the processor 131 may control and may feed in the new brightness level to the timing controller which generates the pulse width modulated signal with new reduced duty cycle. The LEDs chosen for dimming may be based on an LED's distance from the active region.

Figure 9:
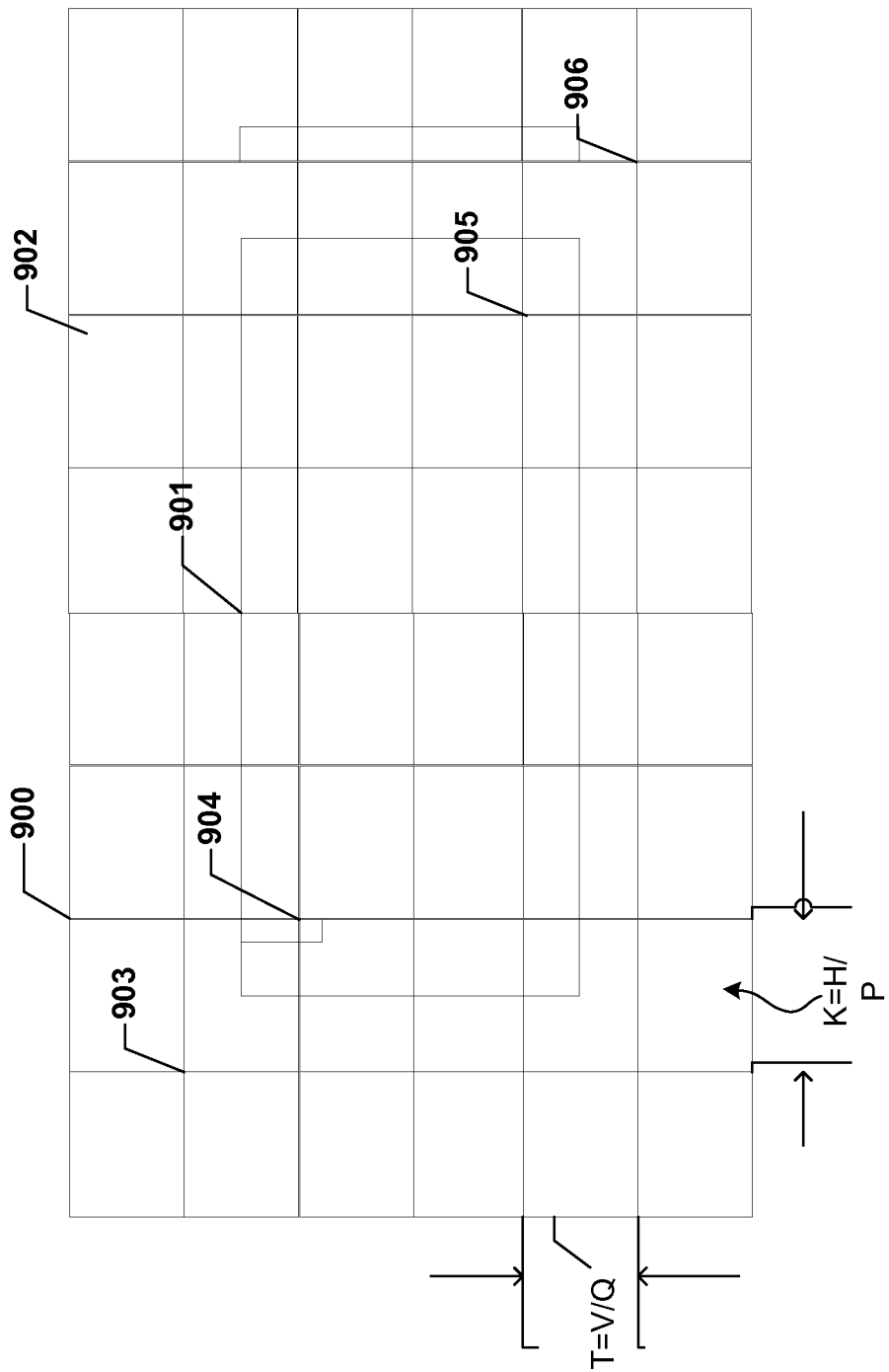
FIG. 9 is an illustration of an active region on a display screen illustrating a correspondence between an active portion and adjustable backlight zones.

FIG. 9 illustrates a screen display 900 illustrating the active region 901. The objective of computing the brightness matrix is to express LED brightness as a function of coordinates given the coordinates of the active region 901. A first step may be to find the rectangular sub-region of the LED grid 900 that encompasses the active window 901, which is defined by several LEDs. The LEDs located inside the active window 901 may be set to a user-desired brightness or predetermined brightness.

A second step may be to dim the backlight LEDs outside the active window 901 in the non-active region 902 to a level proportional to a distance from the active window 901. A first LED 903 has a position that can be described as $(X_1/k, Y_1/t)$. A second LED 904 has a position that can be described as $((X_1/k)+1, (Y_1/t)+1)$. A third LED 905 has a position that can be described as $(X_2/k, Y_2/t)$. A fourth LED 906 has a position that can be described as $((X_2/k)+1, (Y_2/t)+1)$.

To compute the brightness matrix, the processor 131 may determine the LEDs which are within the active region. Here, reference is made to either LEDs or a cluster of LEDs whose brightness levels can be independently controlled.

The active region coordinates are expressed in pixel coordinates and not in LED coordinates below. The display has a resolution H×V wherein H pixels are along a horizontal axis and V pixels are along a vertical axis. A backlight includes P×Q LEDs or LED clusters, which are independently controllable with each LED determined by the coordinates (i, j). The coordinate (i) ranges from 0 to (P−1) and the coordinate (j) ranges from 0 to (Q−1). The active window 901 is enclosed by pixels $(x_1, y_1)$ and $(x_2, y_2)$ and k=(H/P) and t=(V/Q), wherein (k×t) is the size of a small rectangular grid of pixels that is illuminated by a single LED or an individually controllable cluster of LEDs.

An LED with coordinates (i, j) is in the active region 901 if the following two conditions are satisfied:

$(x_1 <= (i \times k) < x_2)$; and $(y_1 <= (j \times t) < y_2)$.

The LED can be expressed as outside of the active region 901 (or in non-active region 902) if the above condition is not met.

The brightness of an LED with coordinates (i, j), bij, is given by the following relation: $bij=b_x(i) \times b_y(j)$, where, determining $b_x(i)$ & $b_y(j)$ depends on whether the LED (i, j) is located inside or outside the active region 901.

If the LED is located inside the active region 901 both $b_x(i)$ & $b_y(j)$ are set to 1, or the predetermined brightness level set by a user.

If the LED is located outside the active region, the brightness can be reduced by a constant factor or by a factor that is inversely proportional to the distance of the LED from the active region 901, or by any other strategy.

If the LEDs are dimmed by a constant factor the following relation may be used to determine $b_x(i)$ and $b_y(j)$. For example, $b_x(i)=1$ if $x_1 \le (i \times k) < x_2$;

$b_x(i)=b_x(i)*$factor if $x_1 > (i \times k) \ge x_2$;

$b_y(j)=1$ if $y_1 \le (j \times t) < y_2$;

$b_y(j)=b_y(j)*$factor if $y_1 > (j \times t) \ge y_2$.

For example, if the brightness of the LEDs are made to be inversely proportional to the distance of the LED from the active region 901 $b_x(i)$ and $b_y(j)$ may be determined as follows:

$b_x(i)=1$ if $x_1 \le (i \times k) < x_2$;

$b_x(i)=b_x(i)*((i \times k)/x_1)$ if $0 \le (i \times k) < x_1$;

$b_x(i)=b_x(i)*(((i \times k)-x_2)/(H-x_2))$ if $x_2 <= (i \times k) < H$;

$b_y(j)=1$ if $y_1 \le (j \times t) < y_2$;

$b_y(j)=b_y(i)*((i \times t)/y_1)$ if $0 \le (I \times t) < y_1$;

$b_y(j)=b_y(i)*(((j \times t)-y_2)/(V-y_2))$ if $y_2 \le (j \times t) < V$;

For example, a brightness level of "1" may be any value or level set by the user. Other values or fraction or percentages of the value set by user are also envisioned.

The representation shown in FIG. 9 includes k=(H/P) pixels, and t=(V/Q) pixels between consecutive LEDs along the horizontal and vertical axes. An active window has starting and ending pixel coordinates are $(x_1, y_1)$ and $(x_2, y_2)$. This active window is enclosed within the sub-rectangle of the LED grid between the LEDs at $((x_1/k), (y_1/t))$ and $((x_2/k)+1, (y_2/t)+1)$. Similarly the sub-rectangle of the LED grid that is enclosed within the active window is between the LEDs at $((x_1/k)+1, (y_1/t)+1)$ and $((x_2/k), (y_2/t))$. LEDs within the active window region 901 may be set to the desired brightness level (as set by user). The LEDs outside this region 902 may have brightness levels inversely proportional to a distance from the active window 901. In this aspect, the processor 131 may determine the LEDs located in the active window 901 using the above algorithms to determine the brightness of each LED.

For example, LEDs 904 and 905 may be determined to be in the active window 901. LEDs 903 and 906 may be determined to be outside of the active window 901. A distance that the LED 903 is located from the active window 901 may be determined. A second distance that the LED 906 is located from the active window 901 may also be determined. The LEDs 905 and 904 may not have a brightness level dimmed as the LEDs are located in the active window 901. However, the LEDs 903 and 906 may be dimmed based on a distance that the LEDs 903 and 906 are located from the active window 901.

Figure 10:
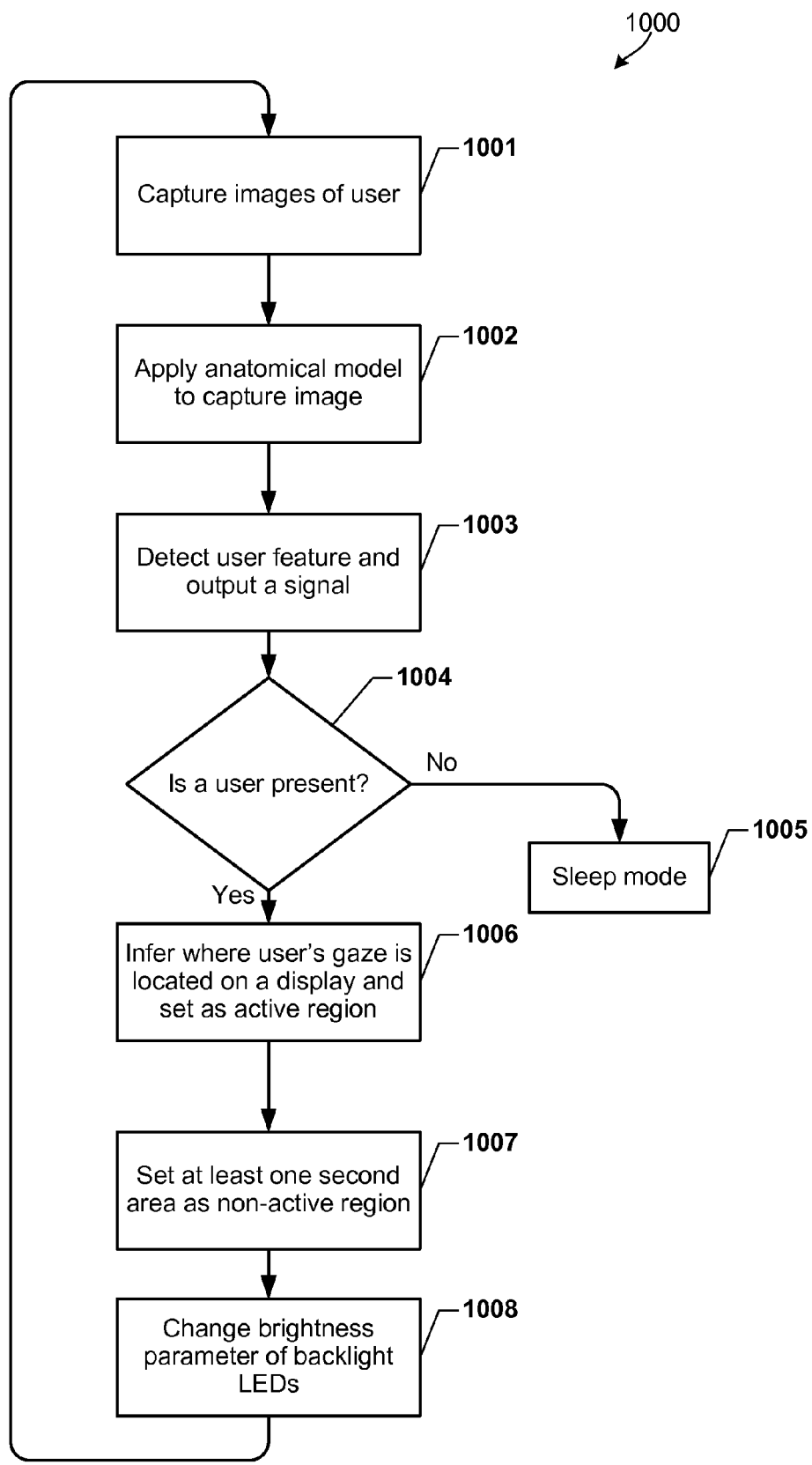
FIG. 10 is a process flow diagram of a method to place the mobile device in a sleep mode if the user is not present at the display.

FIG. 10 illustrates an aspect method 1000 for changing a brightness of a number of backlight LEDs based on a user's gaze to conserve power and operate efficiently in a device 100. Method 1000 may be implemented in a computing device having a processor 131 configured with processor-executable instructions to perform the operations of the method 1000. In method 1000, the processor 131 may commence operation at block 1001 by capturing images of a user using a camera 105.

In block 1002, the processor 131 applies an anatomical model stored in memory 125 to process the image that is captured using the camera 105. Using the anatomical model, the processor 131 may detect a user's eye, or a user's pupil, or other parameters relating to a user's face, such as, a user's two pupils so the processor 131 may infer where the active region is located on the display 105 and output a signal.

In decision block 1004, the processor 131 may use the detected user feature to determine whether the user is present at the mobile device 100. If so (i.e., decision block 1004="Yes"), the processor 131 may calculate where a user's gaze is located on the device display 105. The processor 131 may set the location as the active region in block 1006. On the other hand, if no user is detected, the processor 131 may dim the display or place the mobile device 100 in a sleep mode in block 1005 to conserve power.

In block 1006, the processor 131 may set the area, region, or portion within the user's gaze on the display 105 as the active region. In block 1007, the processor 131 may set at least one second area as a non-active region, or all other regions outside of the active region as the non-active regions. In block 1008, the processor 131 may control the backlight controller and may access the brightness matrix determination block 304 to determine a brightness for each region of the display. The processor may control the backlight controller 305 to change a brightness parameter of the backlight LEDs.

Figure 11:
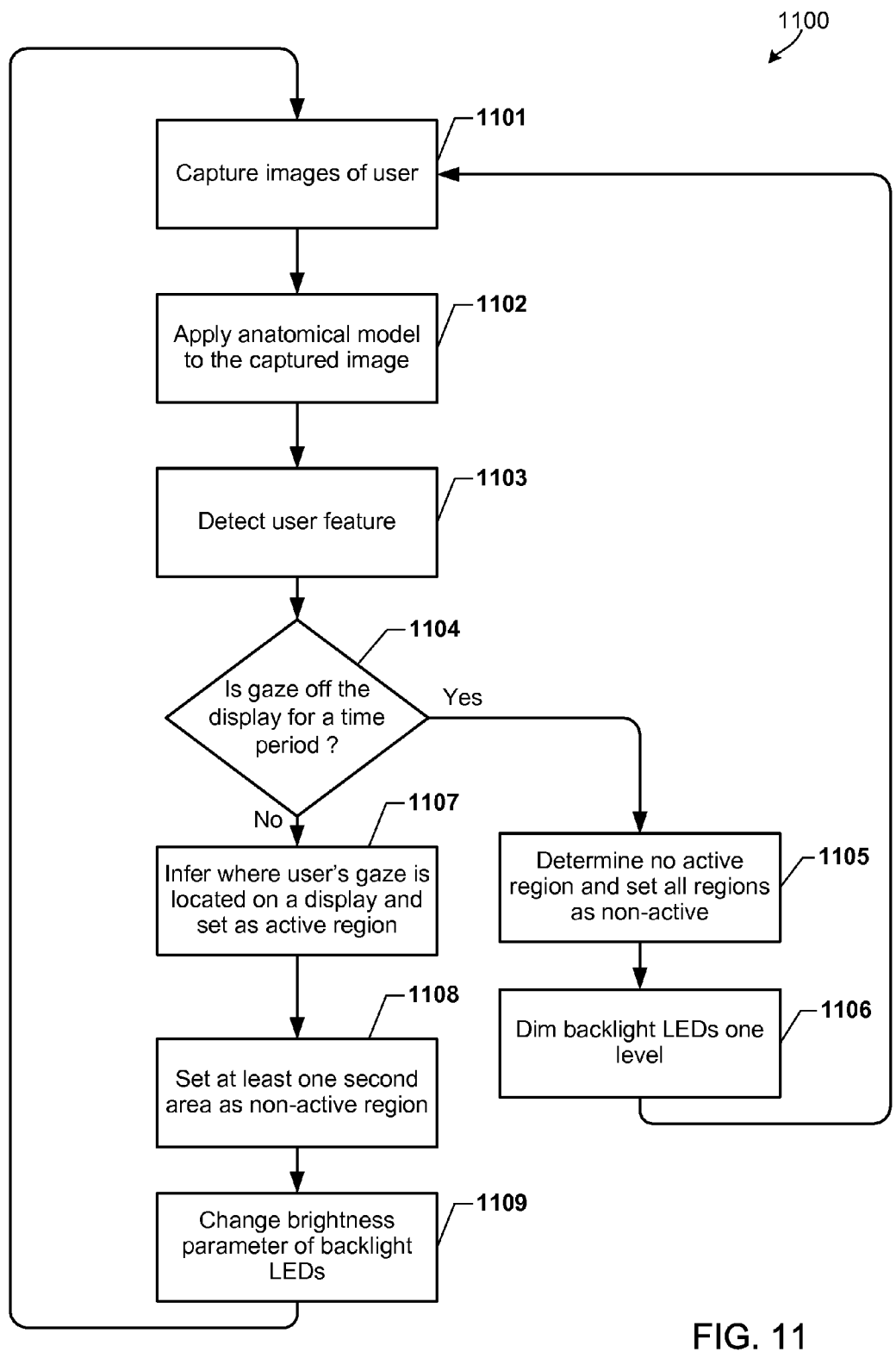
FIG. 11 is a process flow diagram of a method for changing a brightness parameter of backlight LEDs, which is detected to be off the display.

FIG. 11 illustrates an aspect method 1100. In method 1100, the processor 131 may capture images of a user using a camera 105. In block 1102, the processor 131 may apply an anatomical model stored in memory 125 to the captured image. In block 1103, the processor 131 may detect a user feature. In decision block 1104, the processor 131 may use the detected user feature to determine whether the user's gaze is not present at the mobile device display 110 and located off the display 110. If so (i.e., decision block 1104="Yes"), which indicates that the user's gaze is off the display 110, the processor 131 may determine that there is no active region in block 1105 and may dim the backlight LEDs one level in block 1106.

On the other hand, if the detected user feature indicates that there is a user and the user is gazing on the display 110 (i.e., decision block 1104="No"), which indicates that the user is located looking at the display 110, the processor 131 may set the location as an active region in block 1107. In block 1108, the processor may set a non-active region. In block 1109, the processor 131 may control the backlight controller for each region of the display, and may control the backlight controller to change a brightness parameter of the backlight LEDs. In block 1108, the processor 131 may set at least one second area as a non-active region. For example, the processor 131 may determine that user gaze is off the display and the entire display becomes a non-active region, so the processor 131 may simply dim the entire display by one level provided the delay threshold is met.

The processor 131 may use a number of counters associated with a processor of the mobile device 100 to determine when regions are active or inactive in order to avoid flickering or dimming portions that are of interest to the user. The counters may be activated and may count upwardly when it is determined that the user's gaze is located in one of the regions of the mobile device display 110. In another aspect, the counters may start at a value and may count downwardly. The mobile device display 110 may be split into a number of regions, such as a first center most region 210, a second top left region 200, a third top right region 205, a fourth bottom left region 215, a fifth bottom right region 220. Other regions may be possible depending on the mobile display 110. Counters $C_{center}$, $C_{TL}$, $C_{TR}$, $C_{BL}$, $C_{BR}$, $C_{NOS}$ may be associated with each of the regions, initialized to zero and may be incremented every time gaze is on corresponding region of the display. It should be appreciated that the above counters $C_{center}$, $C_{TL}$, $C_{TR}$, $C_{BL}$, $C_{BR}$, $C_{NOS}$ illustrate only one implementation of many different implementations and forms no limitations to the present disclosure.

At any given time, only one of these counters may be nonzero because the user's gaze cannot be simultaneously in more than one direction. These counters may be reset to zero every time the gaze is moved away from or is not located in the region associated with the counter. The counters may indicate the number of consecutive frames (starting from the current frame) for which user's gaze has been on the region 200-220 associated with the counter.

When any of these counts reach a predetermined threshold value, for example, about 30 frames, this may indicate that this is a region of the display that the user is focusing on and that the user is not focusing on other regions of the display 110. The processor 131 can implement the various aspect methods and other regions can be dimmed while the region where the user's gaze is directed can maintain the brightness level or increase in brightness.

Figure 12A:
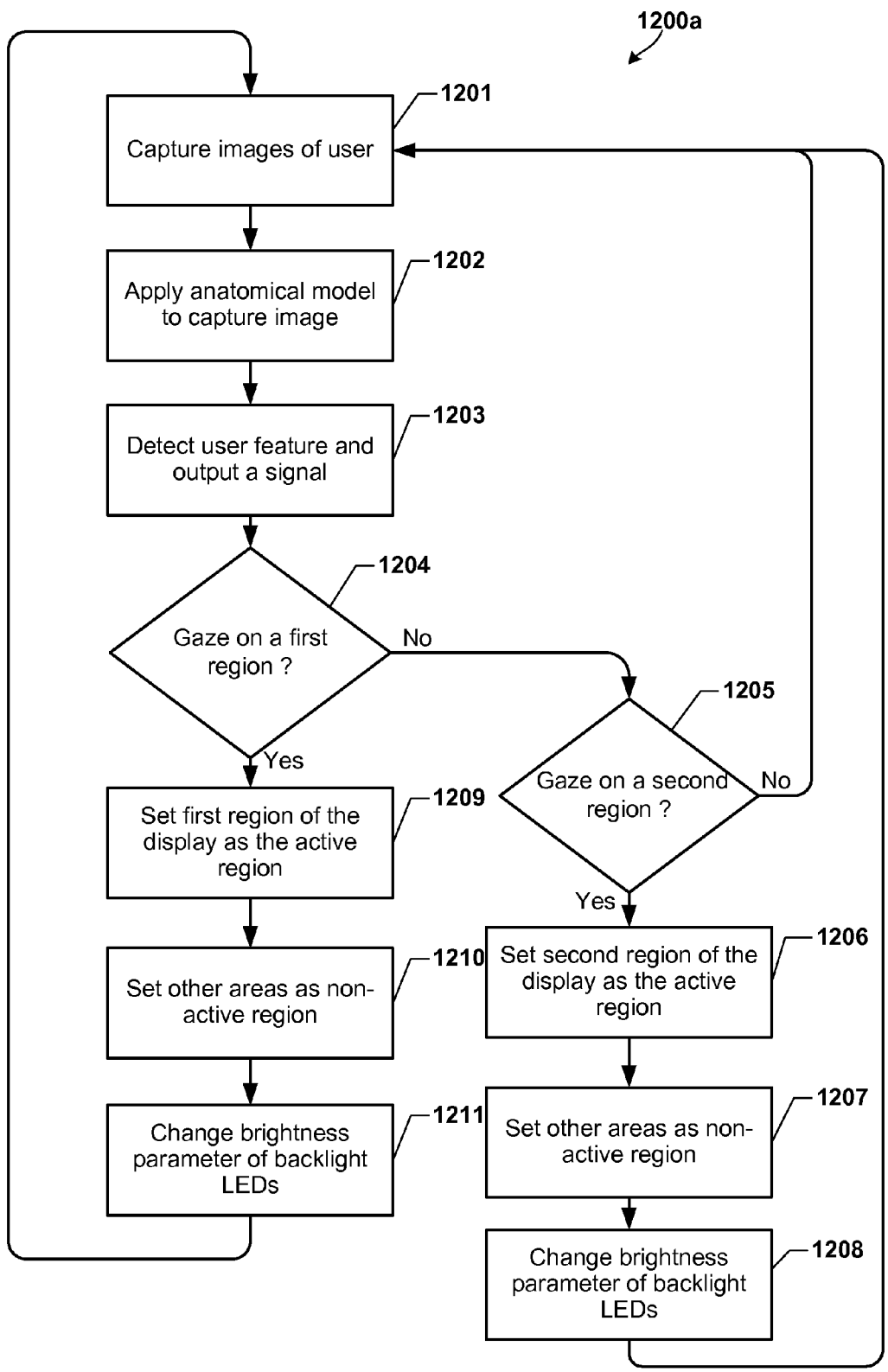
FIG. 12A is a process flow diagram of a method for changing a brightness parameter of backlight LEDs based on an active region.

FIG. 12A shows an aspect method 1200a that may be implemented in a computing device having a processor 131 configured with processor-executable instructions to perform the operations of the method 1200a. In method 1200a, the processor 131 may commence operation at block 1201 by capturing images of a user.

In block 1202, the processor 131 applies an anatomical model to the captured image. The processor 131 using the anatomical model may detect a user's eye, or a user's pupil, or other parameters relating to a user's face, such as, a user's pair of eyes so the processor 131 may infer where the active region is located on the display 110. In block 1203, the processor 131 may detect a user feature. In decision block 1204 the processor 131 may use the detected user feature to determine whether the user's gaze is located on a first region of the display 110.

This may be done as starting the counter and waiting until the counter reaches a threshold, for example 10-100 nanoseconds or more. If so (i.e., decision block 1204="Yes"), which indicates that the user's gaze is on the first region based on the detected user feature for a period of time, the processor 131 may determine the first region of the display 110 is the active region in block 1209. The processor 131 may set other areas as the non-active regions in block 1210 and dim the backlight LEDs in block 1211.

On the other hand, if the detected user feature indicates that the user's gaze is not on a first region 200 of the display 110 based on the detected user feature (i.e., decision block 1204="No"), the processor 131 may infer the user's gaze is located elsewhere. In decision block 1205 the processor 131 may use the detected user feature to determine whether the user's gaze is located on a second region of the display 110. This may be done as starting the counter and waiting until the counter reaches a threshold, for example 10-100 nanoseconds or more. If so (i.e., decision block 1205="Yes"), which indicates that the user's gaze is on the second region 205 based on the detected user feature for a period of time, the processor 131 may determine the second region of the display 110 is the active region in block 1206 and may set the second region as the active region. The processor 131 may set other areas as the non-active regions in block 1207 and may change a brightness parameter of the backlight LEDs in block 1208. On the other hand, if the detected user feature indicates that the user's gaze is not on a second region of the display 110 and not on the first region based on the detected user feature (i.e., decision block 1205="No"), the processor 131 may infer the user's gaze is located elsewhere and capture images for further detection in block 1201. In another aspect, the method 1200 may include a decision block for three, four, five or more regions.

The brightness of a particular light emitting diode may be decreased proportionally relative to distance from the active window. For example, a first backlight LED located close to the active region but in the non-active region may have a first brightness while a second backlight LED located farther away from the first backlight LED may have a second brightness (or may be off) that is half the brightness of the first brightness attributed to the further distance away from the active region. The further distance the LED is located from an active window the higher the amount by which a brightness of the LED that forms the display is decreased. For example, one inch away from the active region, the brightness of an LED of the backlight may fall 50 percent and two inches away the brightness may fall 40 percent to 10 percent brightness. For example, a user may set or program power saving options via an operating systems control setting. In this manner, the user may specify backlight dimming parameters.

Once a region of focus is determined, the algorithm may compute a Target Luminance Matrix (TLM) which may indicates a fraction of a user selected brightness that may be applied to each LED. For each LED, this brightness level may compared with the current brightness level of that LED and if the current brightness is higher than the target, the new brightness level for that LED is set to a one level lower than the current brightness level. For example, the new brightness level may be directly set to the target brightness level. Note that while reducing brightness, the processor 131 may dim one brightness level at a time, but generally will not increase brightness in the same manner. Generally, the processor 131 may restore the brightness to a predetermined full brightness level and not in a gradual manner. This may not be favored by the user. For example, if the target brightness for any LED is '1' as referenced above, a brightness level for that LED may be set to the user selected brightness level, for example, 75 percent of full brightness.

Figure 12B:
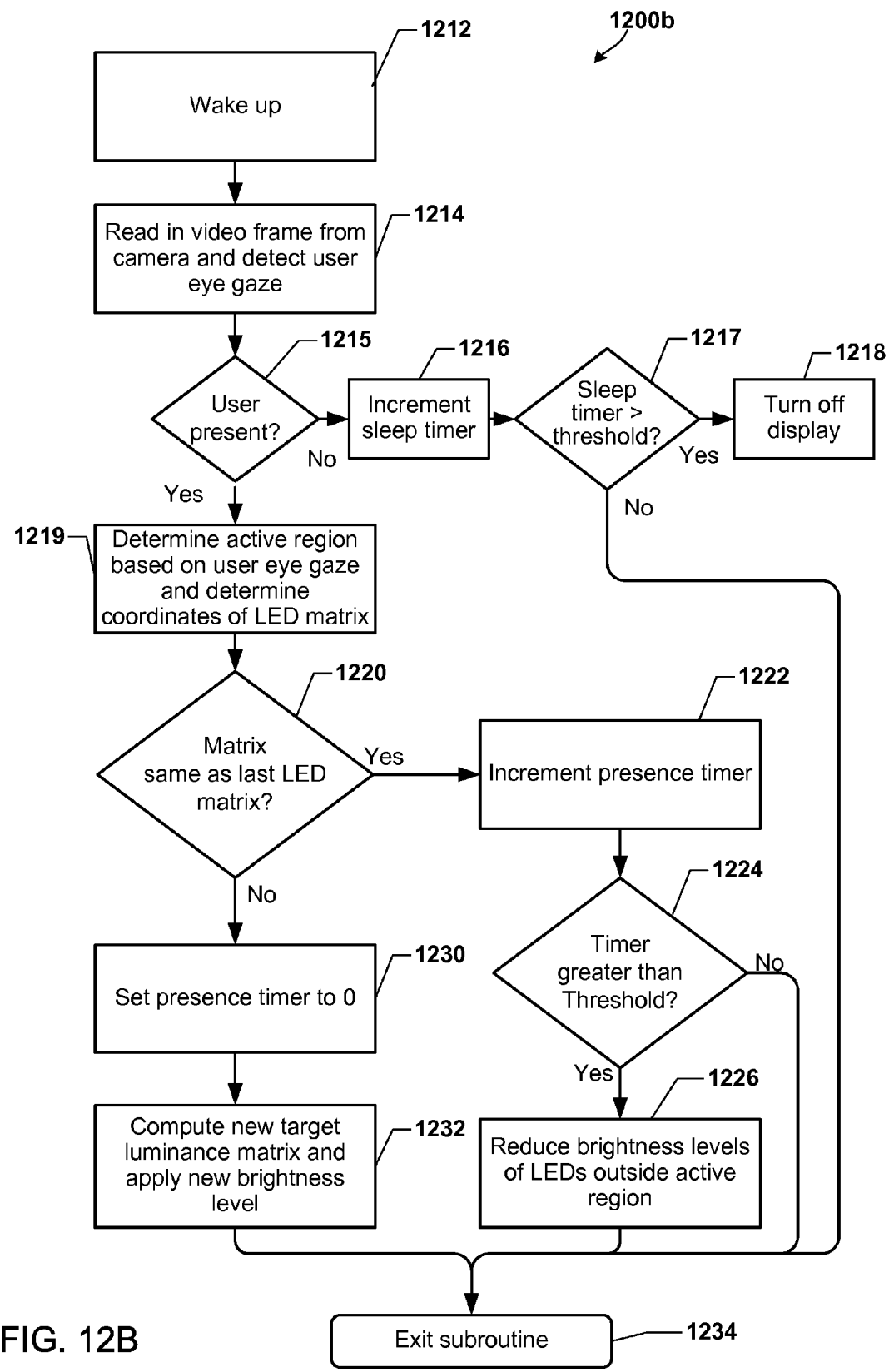
FIG. 12B is a process flow diagram of another aspect method for reducing a brightness parameter of backlight LEDs based on an active region.

FIG. 12B illustrates another aspect method 1200b for reducing brightness levels of LEDs that are located outside of the active window. Depending on system requirements and specifications, the method 1200b may define a rectangular area as the active region centered about user's eye gaze. For example, the active region may be defined beforehand as a length and breadth of a rectangular region, P pixels long and Q pixels wide. To apply a delay threshold, the processor 131 may determine if the active regions in two consecutive iterations of the loop are the same or different. If the active regions are the same in a loop cycle, the processor 131 may increment a presence counter whose purpose is to delay initiating dimming of the backlight for a few seconds to avoid flickering or prematurely dimming a display portion that a user really is engaged with. If the active regions are different in a loop cycle, indicating that the user is looking at or using different portions of the display in the subsequent loop cycle, the processor 131 may reset the presence counter to zero. If the processor 131 determines that the active regions match within two loop iterations, the processor 131 may determine if the delay counter has reached a pre-determined threshold. If the delay counter has reached the threshold, the processor 131 may control the duty cycle of pulses applied to selected backlight LEDs to decrease the brightness level of the non-active region.

Method 1200b may be implemented in a computing device having a processor 131 configured with processor-executable instructions to perform the operations of the illustrated loop. In method 1200b, the processor 131 may commence a loop at block 1212 by awakening the subroutine or loop, and reading in video frame data from the device camera in block 1214. The processor 131 may determine if the user is present in determination block 1215. For example, if the processor cannot recognize a user feature (e.g., head, face, hand, etc.) in the video frame obtained in block 1214, the processor 131 may determine that the user is not present. If the processor determines that a user is not present in the obtained video image (i.e., determination block 1215="no"), the processor may increment a sleep timer in block 1216. In determination block 1217, the processor may determine whether the implemented sleep timer exceeds a sleep threshold. Such a sleep threshold represents an amount of time after a user is no longer detected in a camera image at which the device should turn off the display or shutdown. If the sleep timer does not exceed the sleep threshold (i.e., determination block 1217="no open"), the subroutine or loop may deactivate or go to sleep in block 1234. On the other hand, if the sleep timer does exceed the sleep threshold (i.e., determination block 1217="yes"), the processor may turn off the display in block 1218. Reactivation of the display may require some user input, such as the press of a button or movement of the device.

If the processor determines that a user is present in the obtained video image (i.e., determination block 1215="yes"), in block 1218 the processor 131 may detect a user's eye gaze, determine an active region based on the user's eye gaze, and determine coordinates of a matrix of LEDs that fall within the user's gaze. These operations in block 1218 may be accomplished using methods described above.

In decision block 1220, the processor 131 may compare the coordinates of the matrix of LEDs within the user's gaze with the coordinates of a prior LED matrix to determine whether the matrices share characteristics. If the detected LED matrix is not the same as the LED matrix from the previous loop cycle (i.e., decision block 1220="No") this indicates that the user is viewing different portions of the display than in the last loop cycle and thus has not focused on a particular portion, so the processor 131 may set a presence timer to 0 (i.e., reset the timer) in block 1230. The purpose of the presence timer is to delay dimming portions of the display for a few seconds to avoid flickering when the user's gaze is moving rapidly about on the display (e.g., reading text spanning the width of the display). In block 1232, the processor 131 may compute a new target luminance matrix as described herein, such as to brighten the entire display or a previously dimmed non-active portion since the user is now focusing on a different portion of the display. In block 1232 the processor may apply the new brightness level (which may involve maintaining the current brightness level if the new target luminance matrix is the same as the current target luminance matrix). In block 1234, the subroutine or loop may deactivate or go to sleep until the next loop iteration is initiated.

If the detected LED matrix is the same as the LED matrix from the previous loop cycle (i.e., decision block 1220="Yes"), which indicates that the user is viewing the same general portion of the display and so the matrix of LEDs within the user's gaze is unchanged from the last loop cycle, the processor 131 may increment the presence timer in block 1222. In decision block 1224, the processor 131 may determine whether the timer exceeds a presence threshold value. If so (i.e., decision block 1224="Yes"), which may indicate that the determined LED matrix is the active region because the user's gaze has remained fixed position on the display, the processor 131 may reduce a brightness level of LEDs located outside the active region in block 1226. In block 1234, the subroutine or loop is terminated, and execution of the thread suspends until the next iteration is invoked. On the other hand, if the threshold is not reached (i.e., decision block 1224="No"), the subroutine or loop may deactivate (illustrated as "sleep" in the figure) until the next loop iteration is initiated.

Method 1200b may be executed periodically (i.e., initiating the loop in block 1212) by the processor 131, such as once every 5 seconds, so that the gaze detection process is not performed continuously. The frequency of running the method 1200b may be adjusted so as not to consume too much power running the algorithm by the processor 131. In a particular case, after it is determined that a user is not present and hence the display 110 is turned off in block 1218, the method may not be activated by the processor 131 again until the processor 131 determines by some other method that the user has resumed using the device 100. For example, a particular button press, mouse/keyboard activity or motion sensor may be monitored by the processor 131 to recognize when the user is attending to the device again. Alternatively, the camera may be activated periodically, say once every 5 to 10 seconds, and the user detection algorithm in determination block 1215 performed in order to detect when the user has returned.

Figure 13A:
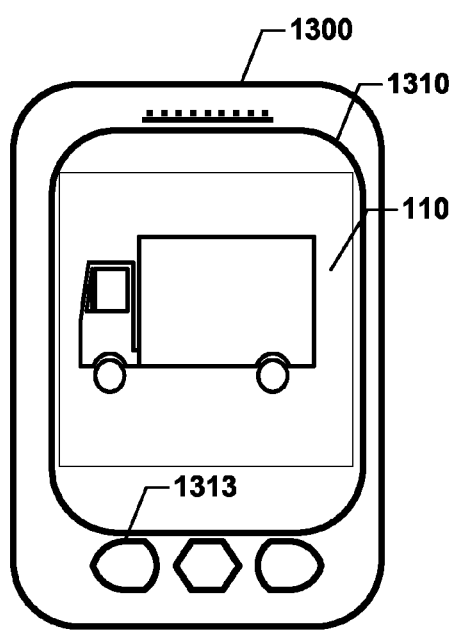
FIG. 13A and FIG. 13B illustrate a tablet device that converts from a full screen display mode to a PDA mode where only a reduced amount of the tablet's display shows an image to save power with a remainder of the display being not illuminated.
Figure 13B:
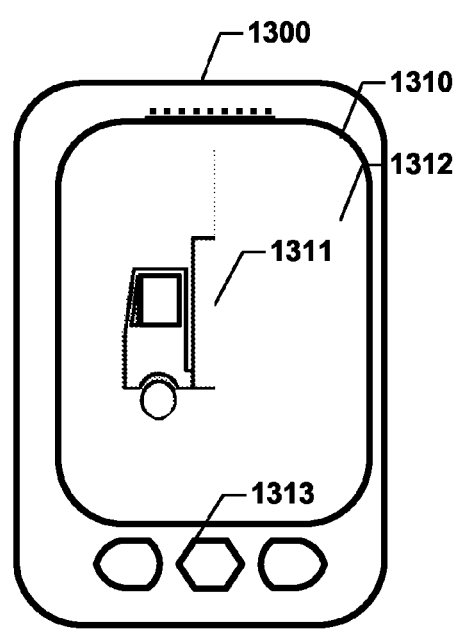

FIG. 13A shows a mobile device that may change a displayed image 110 to save power. The mobile device 1300 including a display 1310 that outputs a displayed image 110. In yet an alternative aspect, the computer 1300 may be a tablet device 1300 and may convert from a full screen display mode to a so called "Personal Digital Assistant" or "PDA" mode where only a reduced amount of the tablet's display to display an image 1311 is used while the remainder of the tablet or a second portion 1312 is dimmed. This is analogous to a "Personal Digital Assistant sized window" 1311 displayed on a larger tablet display 1310. For example, the tablet computer 1300 may display only a small portion of the total display 1310 in PDA mode shown as portion 1311 and dim the remainder of the tablet display 1310 shown as portion 1312 in FIG. 13B, which shows no illumination The processor 131 may detect a low battery condition and provide an indication. The processor 131 may provide an audible signal to the user of the low battery indication. The processor 131 may receive an input from an input device 1313 to change from the full screen display mode to the reduced PDA display mode to conserve power. Alternatively, the processor 131 may compare the power level of the battery to a threshold value and may change from the full screen display 110 to the reduced display mode shown as reference numeral 1311. Likewise, when the battery is recharged, or if the battery is replaced, the display 1310 may sense that condition and change back to the full displayed image 110 in FIG. 13A. In another aspect, the image 1311 of FIG. 13B may further be optionally displayed having a second or reduced resolution where certain LCD elements may be dimmed in addition to turning off the backlight LEDs to achieve further power savings.

In a further aspect, a uniform dimming of the non-active regions across the display 110 may be implemented. In another aspect, the amount of time that the user gazes on the active region before non-active regions are dimmed (referred to as the presence threshold in the description of FIG. 12B) may vary and may be user selectable. For example, the user may program the method to wait for 30 seconds, one minute, or any other value before dimming the non-active regions. In yet another aspect, the device 100 may capture audio using a microphone to assist with determining whether a user is present at the device. For example, the processor 131 may determine that if the surroundings are silent, no user is present and the backlight may be dimmed. This determination may be made in combination with analysis of a captured video image, such as described above with respect to block 1215 through 1218 in FIG. 12B. Alternatively, if multiple different users are determined to be heard, the display backlight may be set to full brightness as a processor 131 may determine that many individuals are viewing the display. The amount of processing to determine the active and non-active region does not use more power than dimming the backlight or a portion thereof as too little savings may occur if too much processing is performed. In this aspect, the mobile device may use a second processor remote from the mobile device to assist the mobile device with determining the active and non-active regions.

Figure 14:
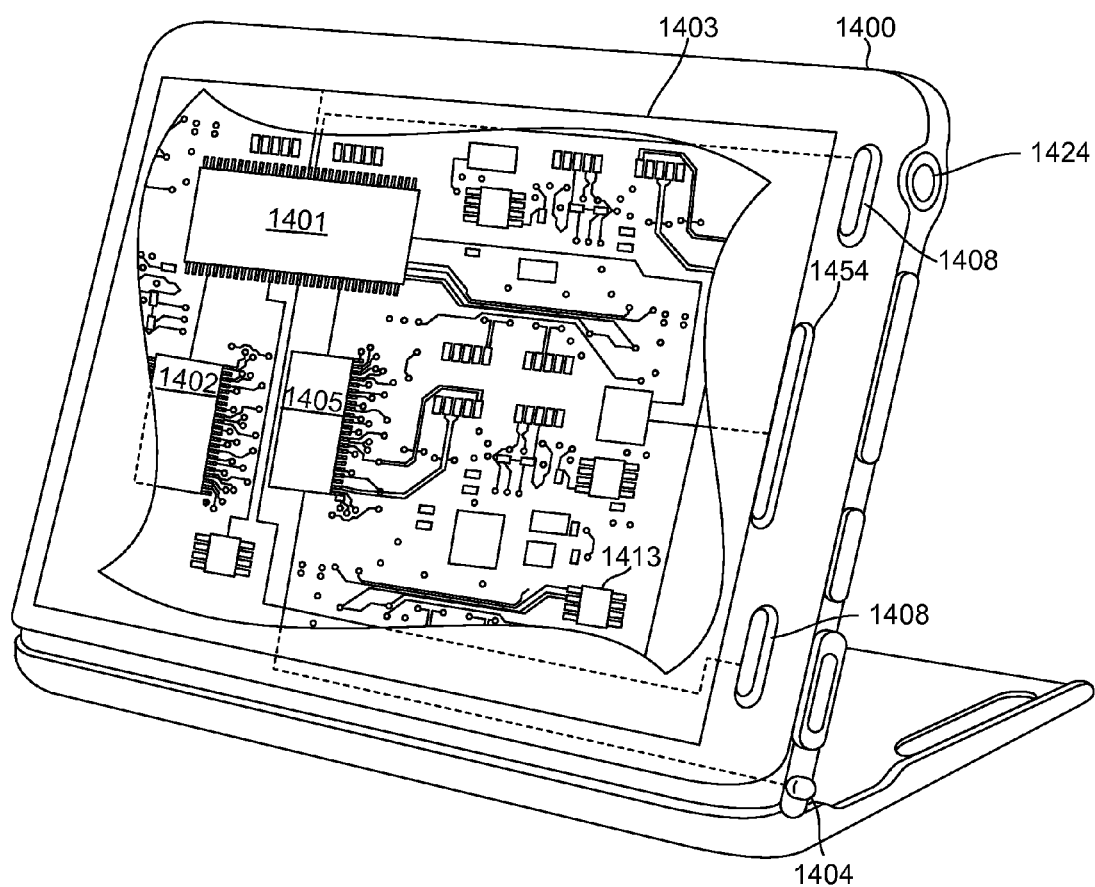
FIG. 14 is a component block diagram of a mobile computing device suitable for use with the various aspects.

FIG. 14 is a system block diagram of a receiver device suitable for use with any of the aspects. A typical receiver device 1400 may include a processor 1401 coupled to internal memory 1402, a display 1403, and to a speaker 1454. Additionally, the receiver device 1400 may include an antenna 1404 for sending and receiving electromagnetic radiation that may be connected to a wireless data link and/or cellular telephone transceiver 1405 coupled to the processor 1401 and a mobile multimedia broadcast receiver 1406 coupled to the processor 1401. Receiver devices 1400 typically also include menu selection buttons or rocker switches 1408 for receiving user inputs.

The processor 1401 may be any programmable microprocessor, microcomputer or multiple processor chip or chips that can be configured by software instructions (applications) to perform a variety of functions, including the functions of the various aspects described above. In some devices, multiple processors 1401 may be provided, such as one processor dedicated to wireless communication functions and one processor dedicated to running other applications. Typically, software applications may be stored in the internal memory 1402 before they are accessed and loaded into the processor 1401. The processor 1401 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1401 including internal memory or removable memory plugged into the device and memory within the processor 1401 itself.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of conserving power usage for a device, comprising:
   dynamically creating a plurality of regions on a display based on a condition of the device, wherein dynamically creating a plurality of regions on the display comprises determining a number of regions of the plurality of regions, a size of each of the regions of the plurality of regions, and a location of each of the regions of the plurality of regions;
   detecting an active region and a plurality of non-active regions of the plurality of regions on the display based on a user interaction with the display; and
   controlling a brightness of a backlight of the display differently for the active region and at least one of the plurality of non-active regions.

2. The method of claim 1, wherein detecting the active region and the plurality of non-active regions comprises:
   imaging a user of the device;
   recognizing a feature of the user;
   determining a gaze of the user based on the recognized feature;
   setting a portion of the display encompassing the user's gaze as the active region; and
   setting portions outside the active region as the plurality of non-active regions.

3. The method of claim 1, further comprising dimming at least one of the plurality of non-active regions to conserve power.

4. The method of claim 1, further comprising increasing a brightness of the active region.

5. The method of claim 1, wherein detecting the active region and the plurality of non-active regions on the display is based on the user interaction with an operating system.

6. The method of claim 1, further comprising dimming at least one of the plurality of non-active regions in a step-wise fashion.

7. The method of claim 1, further comprising dimming at least one of the plurality of non-active regions of the backlight of the display in a proportional manner relative to a distance of a backlight LED from the active region.

8. The method of claim 1, further comprising:
   outputting an image using an liquid crystal display; and
   reducing a size of the image on the liquid crystal display to conserve power.

9. The method of claim 1, further comprising independently controlling a brightness of an independently controllable cluster of one or more LEDs.

10. The method of claim 1, wherein the device is one of a mobile device, a tablet computer, a desktop computer, or a laptop computer.

11. The method of claim 2, further comprising:
    counting how long the user's gaze is on the active region; and
    controlling the brightness after a threshold amount of time.

12. The method of claim 2, further comprising:
    determining if a user's gaze is off the display; and
    dimming an entire display if the user's gaze is determined to be off the display.

13. The method of claim 1, wherein the condition of the device is one of the size or the display, the battery life of the device, the power consumption of the display, or a total number of LEDs in the display.

14. The method of claim 1, further comprising:
    determining a position of LEDs inside or outside the active region; and
    maintaining the brightness of the LEDs outside the active region for a threshold and dimming at the expiration of the threshold.

15. A computing device, comprising:
    a processor;
    a display coupled to the processor, the display comprising a backlight comprising a plurality of light emitting diodes (LED),
    wherein the processor is configured with processor-executable instructions to perform operations comprising:
       dynamically creating a plurality of regions on the display based on a condition of the device, wherein dynamically creating a plurality of regions on the display comprises determining a number of regions of the plurality of regions, a size of each of the regions of the plurality of regions, and a location of each of the regions of the plurality of regions;
       detecting an active region and a plurality of non-active regions of the plurality of regions on the display based on a user interaction with the display; and
       controlling a brightness of a backlight of the display differently for the active region and at least one of the plurality of non-active regions.

16. The computing device of claim 15, wherein the processor is configured with processor-executable instructions to perform operations such that detecting the active region and the plurality of non-active regions comprises:
    imaging a user of the device;
    recognizing a feature of the user;
    determining a gaze of the user based on the recognized feature;
    setting a portion of the display encompassing the user's gaze as the active region; and
    setting portions outside the active region as the plurality of non-active region.

17. The computing device of claim 15, wherein the processor is configured with processor-executable instructions to perform operations further comprising dimming at least one of the plurality of non-active regions to conserve power.

18. The computing device of claim 15, wherein the processor is configured with processor-executable instructions to perform operations further comprising increasing a brightness of the active region.

19. The computing device of claim 15, wherein the processor is configured with processor-executable instructions to perform operations such that detecting the active region and the plurality of non-active regions on the display is based on the user interaction with an operating system.

20. The computing device of claim 15, wherein the processor is configured with processor-executable instructions to perform operations further comprising dimming at least one of the plurality of non-active regions in a step-wise fashion.

21. The computing device of claim 15, wherein the processor is configured with processor-executable instructions to perform operations further comprising dimming at least one of the plurality of non-active regions of the backlight of the display in a proportional manner relative to a distance of a backlight LED from the active region.

22. The computing device of claim 15, wherein the processor is configured with processor-executable instructions to perform operations further comprising:
outputting an image using an liquid crystal display; and
reducing a size of the image on the liquid crystal display to conserve power.

23. The computing device of claim 15, wherein the processor is configured with processor-executable instructions to perform operations further comprising independently controlling a brightness of an independently controllable cluster of one or more LEDs.

24. The computing device of claim 15, wherein the computing device is one of a mobile device, a tablet computer, a desktop computer, or a laptop computer.

25. The computing device of claim 16, wherein the processor is configured with processor-executable instructions to perform operations further comprising:
counting how long the user's gaze is on the active region; and
controlling the brightness after a threshold amount of time.

26. The computing device of claim 16, wherein the processor is configured with processor-executable instructions to perform operations further comprising:
determining if a user's gaze is off the display; and
dimming an entire display if the user's gaze is determined to be off the display.

27. The computing device of claim 15, wherein the condition of the device is one of the size or the display, the battery life of the device, the power consumption of the display, or a total number of LEDs in the display.

28. The method of claim 15, wherein the processor is configured with processor-executable instructions to perform operations further comprising:
determining a position of LEDs inside or outside the active region; and
maintaining the brightness of the LEDs outside the active region for a threshold and dimming at the expiration of the threshold.

29. A computing device, comprising:
means for dynamically creating a plurality of regions on a display based on a condition of the device, wherein the means for dynamically creating a plurality of regions on the display comprises means for determining a number of regions of the plurality of regions, a size of each of the regions of the plurality of regions, and a location of each of the regions of the plurality of regions;
means for detecting an active region and a plurality of non-active regions of the plurality of regions on the display based on a user interaction with the display; and
means for controlling a brightness of the backlight of the display differently for the active region and at least one of the plurality of non-active regions.

30. The computing device of claim 29, wherein means for detecting the plurality of active region and the non-active region comprises:
means for imaging a user of the device;
means for recognizing a feature of the user;
means for determining a gaze of the user based on the recognized feature;
means for setting a portion of the display encompassing the user's gaze as the active region; and
means for setting portions outside the active region as the plurality of non-active regions.

31. The computing device of claim 29, further comprising means for dimming at least one of the plurality of non-active regions to conserve power.

32. The computing device of claim 29, further comprising means for increasing a brightness of the active region.

33. The computing device of claim 29, wherein means for detecting the active region and the plurality of non-active regions on the display comprises means for detecting the active region and the plurality of non-active regions non-active region on the display based on the user interaction with an operating system.

34. The computing device of claim 29, further comprising means for dimming at least one of the plurality of non-active regions in a step-wise fashion.

35. The computing device of claim 29, further comprising means for dimming the at least one of the plurality of non-active regions of the backlight of the display in a proportional manner relative to a distance of a backlight LED from the active region.

36. The computing device of claim 29, further comprising means for independently controlling a brightness of an independently controllable cluster of one or more LEDs.

37. The computing device of claim 29, wherein the computing device is one of a mobile device, a tablet computer, a desktop computer, or a laptop computer.

38. The computing device of claim 29, further comprising:
means for outputting an image using an liquid crystal display; and
means for reducing a size of the image on the liquid crystal display to conserve power.

39. The computing device of claim 30, further comprising:
means for counting how long the user's gaze is on the active region; and
means for controlling the brightness after a threshold amount of time.

40. The computing device of claim 39, further comprising:
means for determining if a user's gaze is off the display; and
means for dimming an entire display if the user's gaze is determined to be off the display.

41. The computing device of claim 29, wherein the condition of the device is one of the size or the display, the battery life of the device, the power consumption of the display, or a total number of LEDs in the display.

42. The computing device of claim 29, further comprising:
means for determining a position of LEDs inside or outside the active region; and
means for maintaining the brightness of the LEDs outside the active region for a threshold and dimming at the expiration of the threshold.

43. A non-transitory computer readable medium having stored thereon processor-executable instructions configured to cause a processor of a computing device to perform operations comprising:
- dynamically creating a plurality of regions on a display based on a condition of the device, wherein dynamically creating a plurality of regions on the display comprises determining a number of regions of the plurality of regions, a size of each of the regions of the plurality of regions, and a location of each of the regions of the plurality of regions;
- detecting an active region and a plurality of non-active regions of the plurality of regions on the display based on a user interaction with the display and
- controlling a brightness of a backlight of the display differently for the active region and at least one of the plurality of non-active regions.

44. The non-transitory computer readable medium of claim 43, wherein the stored processor-executable instructions are configured to cause a processor of the computing device to perform operations such that detecting the active region and the plurality of non-active regions comprises:
- imaging a user of the device;
- recognizing a feature of the user;
- determining a gaze of the user based on the recognized feature;
- setting a portion of the display encompassing the user's gaze as the active region; and
- setting portions outside the active region as the plurality of non-active regions.

45. The non-transitory computer readable medium of claim 43, wherein the stored processor-executable instructions are configured to cause a processor of the computing device to perform operations further comprising dimming at least one of the plurality of non-active regions to conserve power.

46. The non-transitory computer readable medium of claim 43, wherein the stored processor-executable instructions are configured to cause a processor of the computing device to perform operations further comprising increasing a brightness of the active region.

47. The non-transitory computer readable medium of claim 43, wherein the stored processor-executable instructions are configured to cause a processor of the computing device to perform operations such that detecting the active region and plurality of non-active regions on the display is based on the user interaction with an operating system.

48. The non-transitory computer readable medium of claim 43, wherein the stored processor-executable instructions are configured to cause a processor of the computing device to perform operations further comprising dimming at least one of the plurality of non-active regions in a step-wise fashion.

49. The non-transitory computer readable medium of claim 43, wherein the stored processor-executable instructions are configured to cause a processor of the computing device to perform operations further comprising dimming at least one of the plurality of non-active regions of the backlight of the display in a proportional manner relative to a distance of a backlight LED from the active region.

50. The non-transitory computer readable medium of claim 43, wherein the stored processor-executable instructions are configured to cause a processor of the computing device to perform operations further comprising:
- outputting an image using an liquid crystal display; and
- reducing a size of the image on the liquid crystal display to conserve power.

51. The non-transitory computer readable medium of claim 43, wherein the stored processor-executable instructions are configured to cause a processor of the computing device to perform operations further comprising independently controlling a brightness of an independently controllable cluster of one or more LEDs.

52. The non-transitory computer readable medium of claim 43, wherein the stored processor-executable instructions are configured to be executed by a processor of one of a mobile device, a tablet computer, a desktop computer, or a laptop computer.

53. The non-transitory computer readable medium of claim 44, wherein the stored processor-executable instructions are configured to cause a processor of the computing device to perform operations further comprising:
- counting how long the user's gaze is on the active region; and
- controlling the brightness after a threshold amount of time.

54. The non-transitory computer readable medium of claim 44, wherein the stored processor-executable instructions are configured to cause a processor of the computing device to perform operations further comprising:
- determining if a user's gaze is off the display; and
- dimming an entire display if the user's gaze is determined to be off the display.

55. The non-transitory computer readable medium of claim 43, wherein the condition of the device is one of the size or the display, the battery life of the device, the power consumption of the display, or a total number of LEDs in the display.

56. The non-transitory computer readable medium of claim 43, wherein the stored processor-executable instructions are configured to cause a processor of the computing device to perform operations further comprising:
- determining a position of LEDs inside or outside the active region; and
- maintaining the brightness of the LEDs outside the active region for a threshold and dimming at the expiration of the threshold.

* * * * *